(12) United States Patent
VanReenen et al.

(10) Patent No.: US 10,885,607 B2
(45) Date of Patent: Jan. 5, 2021

(54) STORAGE FOR FOVEATED RENDERING

(71) Applicant: QUALCOMM Incorporated, San Diego, CA (US)

(72) Inventors: Robert VanReenen, San Diego, CA (US); Jonathan Wicks, Louisville, CO (US); Tate Hornbeck, Somerville, MA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 15/943,470

(22) Filed: Apr. 2, 2018

(65) Prior Publication Data

US 2018/0350036 A1   Dec. 6, 2018

Related U.S. Application Data

(60) Provisional application No. 62/513,950, filed on Jun. 1, 2017.

(51) Int. Cl.
| | |
|---|---|
| *G06T 3/40* | (2006.01) |
| *G06T 15/20* | (2011.01) |
| *G06T 15/04* | (2011.01) |
| *G06T 11/40* | (2006.01) |
| *G06T 15/00* | (2011.01) |
| *H04N 1/387* | (2006.01) |

(Continued)

(52) U.S. Cl.
CPC ............ *G06T 3/40* (2013.01); *G06F 3/012* (2013.01); *G06F 3/013* (2013.01); *G06T 1/20* (2013.01); *G06T 3/0093* (2013.01); *G06T 11/40* (2013.01); *G06T 15/005* (2013.01); *G06T 15/04* (2013.01); *G06T 15/20* (2013.01); *H04N 1/3876* (2013.01); *H04N 1/3935* (2013.01); *G06T 2207/20021* (2013.01); *G06T 2210/36* (2013.01)

(58) Field of Classification Search
None
See application file for complete search history.

(56) References Cited

U.S. PATENT DOCUMENTS

| | | |
|---|---|---|
| 5,682,441 A | 10/1997 | Ligtenberg et al. |
| 6,366,899 B1 | 4/2002 | Kernz |

(Continued)

FOREIGN PATENT DOCUMENTS

| | | |
|---|---|---|
| WO | 2017015162 A1 | 1/2017 |

OTHER PUBLICATIONS

El-Ganainy T., et al., "Streaming Virtual Reality Content", arxiv.org, Cornell University Library, 201 Olin Library Cornell University Ithaca, NY 14853, Dec. 26, 2016 (Dec. 26, 2016), XP080742938, pp. 1-8.

(Continued)

*Primary Examiner* — Kim Y Vu
*Assistant Examiner* — Nathan J Bloom
(74) *Attorney, Agent, or Firm* — Shumaker & Sieffert, P.A.

(57) ABSTRACT

This disclosure describes examples for foveated rendering. A graphics processing unit (GPU) may render image content for portions of an image at different sizes such as at sizes smaller than the size of the portions, and store the smaller-sized image content in system memory. The GPU or some other processing circuitry may retrieve the smaller-sized image content from the system memory, and perform resizing operations to resize the image content to its actual size.

27 Claims, 8 Drawing Sheets

(51) Int. Cl.
*H04N 1/393* (2006.01)
*G06F 3/01* (2006.01)
*G06T 1/20* (2006.01)
*G06T 3/00* (2006.01)

(56) References Cited

U.S. PATENT DOCUMENTS

| | | |
|---|---|---|
| 6,643,666 B1 | 11/2003 | Kernz |
| 8,619,083 B2 | 12/2013 | Nickolov et al. |
| 8,724,914 B2 | 5/2014 | Inada |
| 2006/0028400 A1* | 2/2006 | Lapstun ............ G02B 26/06 345/8 |
| 2007/0082707 A1 | 4/2007 | Flynt et al. |
| 2010/0226593 A1 | 9/2010 | Gerhard et al. |
| 2010/0229115 A1 | 9/2010 | Augustine et al. |
| 2011/0173570 A1 | 7/2011 | Moromisato et al. |
| 2011/0316884 A1 | 12/2011 | Giambalvo et al. |
| 2012/0139932 A1 | 6/2012 | Sakamoto |
| 2012/0154277 A1 | 6/2012 | Bar-Zeev et al. |
| 2013/0016128 A1 | 1/2013 | Bhatt |
| 2014/0086309 A1 | 3/2014 | Beer-Gingold et al. |
| 2014/0247277 A1* | 9/2014 | Guenter ............ G06T 11/40 345/611 |
| 2014/0267616 A1 | 9/2014 | Krig |
| 2015/0123993 A1 | 5/2015 | Ohba et al. |
| 2016/0148424 A1 | 5/2016 | Chung et al. |
| 2016/0212423 A1 | 7/2016 | Aharon et al. |
| 2016/0284119 A1 | 9/2016 | Surti et al. |
| 2016/0350965 A1 | 12/2016 | Lum et al. |
| 2016/0379606 A1 | 12/2016 | Kollin et al. |
| 2017/0085915 A1 | 3/2017 | Kuusela |
| 2017/0091897 A1 | 3/2017 | Lee et al. |
| 2017/0124760 A1 | 5/2017 | Murakawa et al. |
| 2017/0287112 A1 | 10/2017 | Stafford et al. |
| 2018/0081429 A1 | 3/2018 | Akenine-Moller et al. |
| 2018/0082464 A1 | 3/2018 | Akenine-Moller et al. |
| 2018/0089799 A1 | 3/2018 | Johnson et al. |
| 2018/0137602 A1* | 5/2018 | Spitzer ............ G02B 27/2228 |
| 2018/0158251 A1 | 6/2018 | Pasek |
| 2018/0220068 A1* | 8/2018 | Guenter ............ H04N 5/23232 |
| 2018/0308455 A1* | 10/2018 | Hicks ............ G09G 5/227 |
| 2018/0350032 A1* | 12/2018 | Bastani ............ G06T 3/0093 |
| 2018/0357809 A1* | 12/2018 | Lawless ............ G06T 3/0093 |
| 2019/0172213 A1* | 6/2019 | Wicks ............ G06T 1/20 |

OTHER PUBLICATIONS

Guenter B., et al., "Foveated 3D Graphics", Proceedings ACM SIGGRAPH Asia, Nov. 2012, vol. 31, No. 6, XP055199808, 10 pages.

International Search Report and Written Opinion—PCT/US2018/025906—ISA/EPO—dated Jul. 3, 2018 (16 pp).

OPTOVR: "Timewarp—Virtual Reality and Augmented Reality Wiki—VR & AR Wiki," Nov. 29, 2016 (Nov. 29, 2016), XP055486267, pp. 1-3, Retrieved from the Internet: URL:https://xinreality.comjmediawiki/index.php?title=Timewarp&oldid=18615 [retrieved on Jun. 20, 2018].

"Resolution—Is it possible to render part of the screen in different pixel density using openGL?—Game Development Stack Exchange," retrieved on Aug. 17, 2016 (1 page) retrieved at http://gamedev.stackexchange.com/questions/47722/isitpossibletorenderpartofthescreenindifferentpixeldensityusingope.

U.S. Appl. No. 15/390,333, filed by Sklyer Jonathon Saleh et al., filed Dec. 23, 2016.

International Preliminary Report on Patentability from corresponding PCT Application Serial No. PCT/US2018/025906 dated Dec. 12, 2019 (10 pp).

Funt B., et al., "Strategies for Foveated Compression and Transmission", Jul. 15, 2016, XP055508690, Retrieved from the Internet: URL:https://static.googleusercontent.com/media/research.google.com/en//pubs/archive/46452.pdf [retrieved on Sep. 21, 2018], 3 pages.

* cited by examiner

STORAGE FOR FOVEATED RENDERING

This application claims the benefit of U.S. Provisional Application No. 62/513,950, filed Jun. 1, 2017, the entire contents of which are hereby incorporated by reference.

TECHNICAL FIELD

This disclosure relates to graphics processing.

BACKGROUND

Computing devices often utilize a graphics processing unit (GPU) to accelerate the rendering of graphics data for display, and display processing unit (DPU) to generate the signal that drives a display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. The DPU retrieves image content generated by the GPU and further processes the image content to generate the signal to drive the display to cause the display to present the image content.

SUMMARY

This disclosure is directed to sparse foveated rendering of graphics content. A graphics processing unit (GPU) may render image content of a portion of an image based on the resolution of the image content in that portion, rather than the size of the portion. For instance, if the resolution of the image content is less than that of the size of the portion, the GPU may render the image content having smaller size relative to the size of the portion. The GPU may repeat these operations for each portion in the image, and store the image content of each portion in a memory external to the GPU. By storing the image content with the smaller size (e.g., relative to the size of the portion that the image content covers), the GPU may reduce the amount of image content that needs to be stored to the external memory, thereby reducing memory bandwidth.

The GPU or another processing circuit may retrieve the image content in its smaller size from the external memory, and then resize the image content so that the size of the image content is the same as the size of the portion the image content is to cover. One example way to resize the image content is with texture mapping techniques that map the image content with the smaller size to a mesh that is the size of the portion, thereby stretching the image content back to its actual size.

In one example, the disclosure describes a method of generating image content, the method comprising determining that a first portion of an image to be displayed includes image content having a first resolution, wherein the first resolution is less than a second resolution of one or more other portions of the image, rendering the image content for the first portion, at a size smaller than a size of the first portion, based on the first resolution of the image content in the first portion, to generate smaller-sized image content associated with the first portion, storing the smaller-sized image content in a system memory, retrieving the smaller-sized image content from the system memory, and resizing the smaller-sized image content back to the size of the first portion of the image.

In one example, the disclosure describes a device for generating image content, the device comprising a system memory, and processing circuitry comprising at least one of programmable or fixed-function circuitry and a local memory, wherein the processing circuitry is configured to determine that a first portion of an image to be displayed includes image content having a first resolution, wherein the first resolution is less than a second resolution of one or more other portions of the image, render the image content for the first portion, at a size smaller than a size of the first portion, based on the first resolution of the image content in the first portion, to generate smaller-sized image content associated with the first portion that is stored in the local memory, store the smaller-sized image content from the local memory to the system memory, retrieve the smaller-sized image content from the system memory, and resize the smaller-sized image content back to the size of the first portion of the image.

In one example, the disclosure describes a device for generating image content, the device comprising means for determining that a first portion of an image to be displayed includes image content having a first resolution, wherein the first resolution is less than a second resolution of one or more other portions of the image, means for rendering the image content for the first portion, at a size smaller than a size of the first portion, based on the first resolution of the image content in the first portion, to generate smaller-sized image content associated with the first portion, means for storing the smaller-sized image content in a system memory, means for retrieving the smaller-sized image content from the system memory, and means for resizing the smaller-sized image content back to the size of the first portion of the image.

In one example, the disclosure describes a computer-readable storage medium having instructions stored thereon that when executed cause one or more processors of a device for generating image content to determine that a first portion of an image to be displayed includes image content having a first resolution, wherein the first resolution is less than a second resolution of one or more other portions of the image, render the image content for the first portion, at a size smaller than a size of the first portion, based on the first resolution of the image content in the first portion, to generate smaller-sized image content associated with the first portion, store the smaller-sized image content in a system memory, retrieve the smaller-sized image content from the system memory, and resize the smaller-sized image content back to the size of the first portion of the image.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
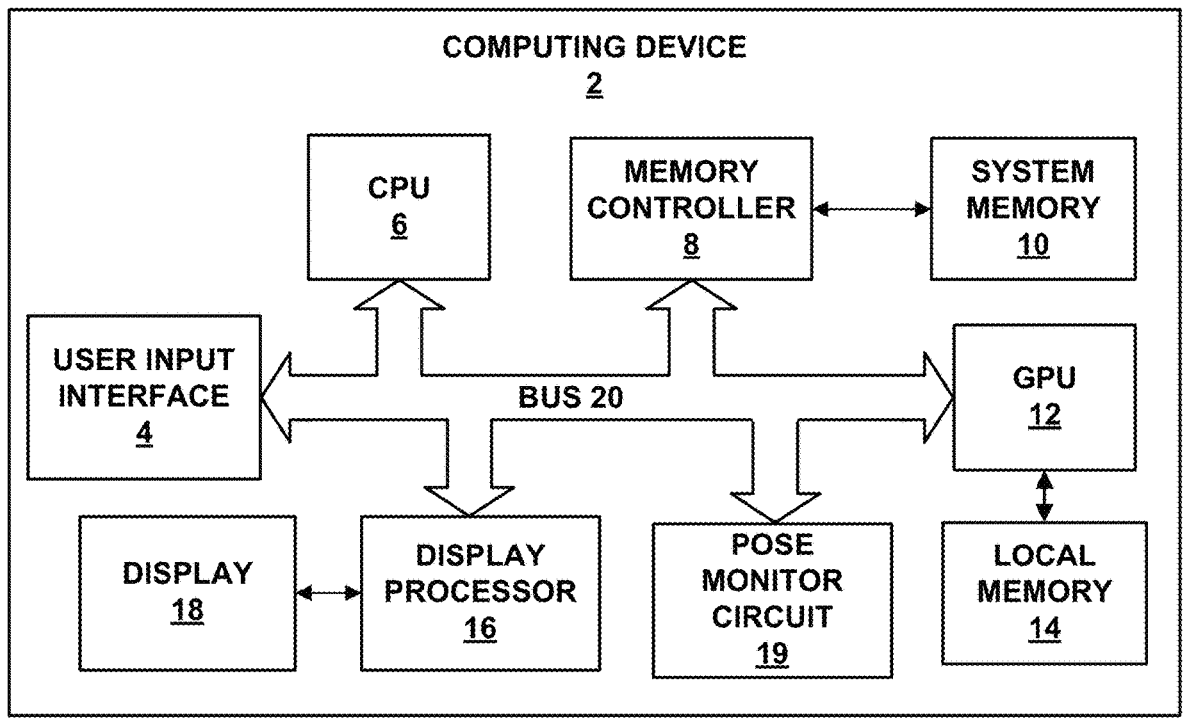
FIG. 1 is a block diagram illustrating an example computing device that may be used to implement the techniques of this disclosure.

Foveated rendering is a technique that aims to reduce fragment processing workload, bandwidth, and other rendering workloads by reducing the average resolution of a framebuffer while maintaining a high image quality by leaving the focal point of a rendering at full resolution. For example, in foveated rendering, different portions of the image frame are at different resolutions. This causes certain portions to appear blurrier than other portions.

Foveated rendering has the benefit of workload efficiency, reduced power, and better viewer experience. Generating lower resolution image content generally requires less processing than higher resolution image content, and therefore, foveation tends to reduce the overall amount of processing. Also, the image content creator may desire the viewer to focus on certain portions of the image (e.g., foreground vs. background) or there may be portions of less interest to the viewer. By making some portions of the image blurry and other portions sharp, the viewer may tend to shift attention to the sharper portions. In some examples, foveation may be a tool to guide the viewer to view certain portions of the image.

A graphics processing unit (GPU) may be configured to perform the foveated rendering. As one example, the GPU may perform the foveated rendering for virtual reality (VR) or augmented reality (AR) applications. In VR and/or AR applications, the GPU may generate image content for display in two rounds: eye-buffer round and warping round. In the eye-buffer round, the GPU may generate eye-buffer image content based on received image content information, such as from a server. In the warping round, the GPU may then use the eye-buffer image content to generate image content based on the current position of the user's eye or head.

For instance, the device that includes the GPU may request and receive image content information from the server, and the image content information that the device receives may be based on the position of the eye(s) or head of the user. For the eye-buffer round, the GPU may generate the image content based on the received image content information. However, the position of the user's head may have changed from the time of the request to the present time. Accordingly, in the warping round, the GPU may warp the image content generated in the eye-buffer round to accommodate for any change in the position of the user's head.

After the eye-buffer round, the GPU stores the generated eye-buffer image content to system memory that is external to the GPU. For the warping round, the GPU retrieves the eye-buffer image content from the system memory, performs warping to generate warped image content, and stores the warped image content back to the system memory. Such transfer of image content back-and-forth between the GPU and the system memory may be memory bandwidth inefficient, especially if the entire image worth of image content needs to be written to and read from the system memory.

The example techniques described in this disclosure relate to ways to leverage foveation, while minimizing the amount of image content that needs to be written to and read from the system memory. For example, for a particular portion of an image, the GPU may render image content associated with that portion at a size smaller than the size of the portion based on the image resolution that is desired for that portion. Image resolution is a measure of how blurry (e.g., lack of sharpness) a portion is. For instance, for portions of the image where the user is not focusing or should not focus, the GPU may render image content at a size smaller than the size of those portions. When the image content is eventually resized, prior to display, the image content for that portion may appear blurrier than portions for which the GPU rendered image content at the same size as the portion.

As an example, assume that a user is not focusing or should not focus on a first 16×16 sized portion, and should be focusing on a second 16×16 sized portion. In this example, the GPU may render image content for the first 16×16 sized portion at a size smaller than 16×16 (e.g., generate image content with size 4×4, 8×8 etc.). This smaller-sized image content is associated with the first 16×16 sized portion. The GPU may render image content for the second 16×16 sized portion at the same size of 16×16 (e.g., generate image content with size 16×16). In this example, when the smaller-sized image content is eventually resized back to 16×16 (or possibly another size), the image content in the first 16×16 sized portion may appear blurrier than the image content in the second 16×16 sized portion. The image content in the first 16×16 sized portion may appear blurrier as compared to the image content in the second 16×16 sized portion because there was less independent image content available for generating the image content in the first 16×16 sized portion as compared to the second 16×16 sized portion.

In the example techniques described in this disclosure, the GPU may output the smaller-sized image content associated with a portion (e.g., for a portion having the reduced image resolution) to a system memory, rather than resizing the image content back to the actual size of the portion and storing the resized image content. In this way, the GPU may reduce the amount of image content that needs to be written to the external memory (e.g., as part of the eye-buffer round), resulting in the reduction of memory bandwidth. Also, when the GPU needs to read the image content (e.g., as part of the warping round), the GPU may read less image content as compared to if image content for the entire portion were stored. The GPU may then resize the image content, and perform operations of the warping.

In some examples, during the eye-buffer round, the GPU may generate (e.g., render) more image content than is needed for viewing. The reason is to ensure that even if the user were to move his or her head, there is image content that is available for warping. As an example, when the device requests image content as part of the eye-buffer round, the device may request image content that would be visible to the user based on current eye and/or head position, as well as additional image content beyond the periphery of image content that the user would be able to see. The reason for this additional image content is because the user may further move his or her head prior to the warping round, and having this additional image content is valuable to ensure that there is image content available for warping.

However, the amount of image content needed for the warping round may be less than the amount of image content rendered during the eye-buffer round. Again, during the eye-buffer round, the GPU may render more image content than would be viewable to the user. During the warping round, the GPU may render image content that is viewable to the user, which may be some or all of the image content (e.g., subset of image content) rendered during the eye-buffer round.

As described above, during the eye-buffer round, the GPU may output the smaller-sized image content associated with a portion (e.g., for a portion having the reduced image resolution) to a system memory, rather than resizing the image content back to the actual size of the portion and storing the resized image content. Then, as part of resizing, the GPU may only resize the smaller-sized image content that is needed for warping. Accordingly, in some examples, the resizing of the image content may not result in resizing the image content back to the same size as in the eye-buffer round, but rather, the resizing of the image content is to resize back to the size needed to fill in the image content that is displayed, which may be less than the size of the image content in the eye-buffer round.

To implement the resizing, in one example, the GPU may perform texture mapping (e.g., via texture circuitry of the GPU). In texture mapping, the GPU overlays a texture image onto a two-dimensional or three-dimensional mesh. For resizing, the GPU may utilize the smaller-sized image content as the texture image, and in this example, a two-dimensional mesh may have the same size as the image portion of the image associated with the smaller-sized image content. Because the smaller-sized image content is smaller than the size of the mesh (e.g., size of the image portion), for texture mapping, the GPU may stretch the smaller-sized image content to overlay it on the mesh. For instance, the GPU may map a primitive (e.g., triangle) in the texture image (e.g., in the smaller-sized image content) to a primitive in the mesh, where the area of the primitive in the texture image is smaller than the area of the primitive in the mesh. In this example, the mapping causes stretching of the primitive in the texture image because the primitive in the texture image is smaller than the primitive in the mesh.

Resizing using texture mapping is one example, and other example techniques exist. For instance, the GPU may copy pixel values to resize the image content. As an example, if the size of the smaller-sized image content is 8×8 and the size of the image portion is 16×16, the GPU may copy each pixel in the 8×8 sized image content three times so that there are four pixels to generate image content for the 16×16 sized portion.

In some examples, the GPU may generate the smaller-sized image content as part of a two-pass processing scheme. In the first pass, referred to as a binning pass, the GPU divides an image (e.g., image frame) into a plurality of bins (also referred to as tiles). These bins or tiles are one example of portions in the image having the different resolutions. The GPU determines which primitives (e.g., triangles) belong to which tiles in the binning pass. In the next pass, referred to as a rendering pass, the GPU renders the primitives on a tile-by-tile basis (e.g., render primitives on a per-bin basis).

In examples described in this disclosure, an application (e.g., a video game) executing on a central processing unit (CPU) may determine image resolutions of the different portions of the image frame for foveated rendering, or a server may provide information indicating the image resolutions of different portions of the image frame for foveated rendering. In rendering each tile, the GPU may first determine the image resolution of the portion captured by that tile. Then, rather than rendering the image portion of that tile to be the same size as the tile (e.g., so that the image portion covers the entire tile), the GPU may render image content at a smaller size (e.g., less than the size of the tile). The GPU may repeat this for each tile.

For purposes of illustration only, the example techniques are described with respect to eye-buffer round and warping round; however, the example techniques are not so limited. For instance, the example techniques may be applicable for various post-processing effects, in addition to or instead of warping. Moreover, in some examples, the warping may be performed without re-sizing the image content, and the re-sizing may be performed by a processing circuit other than the GPU. Also, even in examples where warping is not performed, it may be possible for the re-sizing to be performed by another processing circuit other than GPU.

FIG. 1 is a block diagram illustrating an example computing device 2 that may be used to implement techniques of this disclosure. Computing device 2 may comprise a camera, a computer (e.g., personal computer, a desktop computer, a laptop computer, a tablet computer and/or a computer workstation), a video game platform or console, a mobile device such as wireless communication device (e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a set-top box, a broadcast receiver, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14 of GPU 12, a display processor 16, a display 18, pose monitor circuit 19, and bus 20. User input interface 4, CPU 6, memory controller 8, GPU 12 and display interface 16 may communicate with each other using bus 20. Bus 20 may be any of a variety of bus structures, such as a third-generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a media editing application a video game application, a graphical user interface application, a teleconferencing application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6, forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated circuits or discrete logic circuits.

GPU 12 may be directly coupled to GPU local memory 14. Thus, GPU 12 may read data from and write data to GPU local memory 14 without necessarily using bus 20. In other words, GPU 12 may process data locally using local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display processor 16 may retrieve the data from the frame buffer and configure display 18 to display the image represented by the rendered image data. Although shown separately, display processor 16 may not be a separate processor or separate integrated circuitry. Rather, the example functions of display processor 16 may be performed at/by GPU 12.

In some examples, display processor 16 may include a digital-to-analog converter (DAC) that is configured to convert the digital values retrieved from the frame buffer into an analog signal consumable by display 18. In other examples, display processor 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

In some examples, GPU 12 may generate image content at different image resolutions, in what is referred to as foveated rendering. As described in more detail, GPU 12 may first render image content at a pixel resolution lower than a full resolution, and then store the rendered image content, which may require less memory bandwidth as compared to rendering image content at full resolution and storing the image content. The image resolution of the image content may be less than the image resolution of a portion that GPU 12 rendered at full pixel resolution.

Pixel resolution and image resolution should not be confused. Pixel resolution refers to a number of pixels rendered for a portion of the image. Image content having a higher pixel resolution means that there are more independently generated pixel values for pixels in the higher pixel resolution image content than independently generated pixel values for pixels in the lower pixel resolution image content.

Image resolution is indicative of how sharp or blurry the final image content appears. Pixel values for pixels are not independently generated; rather final pixel values are used to copy, interpolate, or average to generate the pixel value of a pixel that is part of the image content.

As an example, assume that GPU 12 generates 32×32 pixels worth of image content for a first portion having a size of 32×32, and generates 16×16 pixels worth of the same image content for a second portion having a size of 32×32. Also, assume that GPU 12 resizes the 16×16 pixels worth of image content to 32×32 for the second portion.

In this example, the first portion of size 32×32 and the second portion of size 32×32 each have the same pixel resolution (e.g., 32 pixels by 32 pixels). However, even if the image content is the same, the image resolution of the first portion and the second portion may be different. The second portion may appear blurrier than the first portion. One reason for this may be that the first portion includes more independent image content per pixel as compared to the second portion.

Accordingly, the first portion and the second portion may include the same number of pixels in a given area, but the image may not appear any sharper or clearer because no new, independently generated image content is added in the second portion. Therefore, the image content in this resized portion may be blurry due to the resizing, and hence, the image resolution in that resized portion may be less than the image resolution in other portions. As described, image resolution of a portion is a measure of the detail the image portion holds. If GPU 12 adds additional pixels (e.g., via resizing), but there is no increase in detail, the image resolution drops.

The image resolution may be inversely correlated to the amount of resizing. The more resizing that GPU 12 performs the lower the image resolution will be. For example, the image resolution of image content of a portion that GPU 12 resized by 16× is lower than the image resolution of image content of a portion that GPU 12 resized by 2× or that GPU 12 did not need to resize.

There may be various reasons why GPU 12 may generate image content at different image resolutions. As one example, rendering image content at lower pixel resolutions generally requires less power than rendering image content at higher pixel resolutions because there are fewer pixels to process in the lower pixel resolution image content. For example, GPU 12 consumes power every time a pixel shader executes. For a lower pixel resolution image content, there are fewer executions of the pixel shader because there are fewer pixels than for higher pixel resolution image content. Resizing tends to require less power than generating independent pixel values (e.g., because there are fewer operations). Therefore, generating image content at a lower pixel resolution relative to full pixel resolution and then resizing to generate image content at a lower image resolution relative to a full image resolution consumes less power than generating image content at the full image resolution.

As another example, generating image content at different image resolutions can be used to focus a user's attention to certain portions. Image content at higher image resolutions appears sharper than image content at lower image resolutions, and the user tends to automatically focus on the higher image resolution portion or portions. By causing GPU 12 to render image content at different pixel resolutions, that are then resized to generate image content at different image resolutions, content providers can ensure that the viewer is focused on particular areas, which may be of greater interest than other areas, resulting in a better viewing experience.

Therefore, in some cases, GPU 12 may perform foveated rendering to reduce power consumption due to processing of few pixels while generating image content at high resolution for portions where the viewer should be focusing. There may be additional reasons for foveated rendering, and the example techniques should not be considered limited to these particular reasons for foveated rendering.

In some examples, foveated rendering may be useful in virtual reality (VR) and/or augmented reality (AR) applications. As an example, in VR applications, device 2 may be an example of a head mounted device (HMD) that the user mounts to his/her head with display 18 being in front of the eyes. As the user moves his or her head or eyes, display 18 displays different image content. Such applications give the viewer the impression of being submerged in the image content.

Because the user may be constantly moving eyes or head based on the experience provided by the VR application, GPU 12 may need to render image content at a relatively fast rate. Therefore, there may be benefits of foveated rendering, which allows GPU 12 to generate fewer pixel values for faster rendering. Also, because the user is generally focused on a particular location, even if the surrounding image content need not be as sharp, there may not be much or any reduction in user experience.

As another example, and as described above and described in more detail below, in VR applications, there is an eye-buffer round and a warping round. During the warping round, GPU 12 may perform barrel distortion. In barrel distortion, the image content located in the center of where a user is viewing is in focus, as compared to image content at the periphery, which may not be in focus. Accordingly, with foveation, the image resolution of the image content at the periphery may be reduced relative to image content more in the center of where the user is viewing because image content along the periphery may not be of interest to the user.

Pose monitor circuit 19 may track the position of the user's eyes and/or head (e.g., via accelerometers, eye-tracking circuitry, and the like). User input interface 4 may output the pose information to an external server that is providing the image content information for the image content that is to be displayed on display 18. Based on the pose information, the server may determine what image content information to send. For instance, the server may send image content information that encompasses the area where the user is looking at the time the request was sent, as well as image content of surrounding areas that may not be viewable by the user, but could be viewable if the user changed the position of his or her eyes or head. However, to save bandwidth, the server may only send image content information to generate image content for an image (e.g., image frame displayed on display 18) for where the user is looking at the time the request is sent.

GPU 12 may render the image content based on the received image content information, in what is referred to as the eye-buffer round. In rendering this image content, GPU 12 may perform example techniques described in this disclosure. For example, GPU 12 may render image content for different portions of the image at different sizes (e.g., sizes smaller than the size of the portion) based on the resolutions. GPU 12 may then store the image content having the smaller size relative to the size of the portion with which the image content is associated in system memory 10.

In VR applications, there is a possibility that the user changed his or her head from the position they were in when the request of the image content information was transmitted. To account for this change in position, GPU 12 may retrieve the smaller-sized image content from system memory 10, resize the image content back to the size of the portion with which the image content was associated, and warp the image content (e.g., shift or rotate the image content) in the direction in which the user moved his or her head, in what is referred to as a warping round. Otherwise, the user may experience judder, which can negatively impact the experience. In some examples, GPU 12 may first warp the image content, and then resize the image content. In some examples, GPU 12 may warp and resize the image content in a common operation.

GPU 12 may then store the resulting image content for an image in system memory 10. Display processor 16 may retrieve the image content from system memory 10, and drive display 18 to display the image content. If the user's eyes or head move, the above example operations repeat. In some examples, even if the user's eyes or head do not move, GPU 12 may keep using the foveated rendering techniques described in this disclosure to reduce the amount of image content that is generated.

In VR applications, and possibly non-VR applications as well, as described above, GPU 12 may need to store image content to system memory 10, and then GPU 12 or possibly another circuit such as display processor 16 may retrieve the image content from system memory 10. In examples described in this disclosure, in storing the image content, GPU 12 may store image content for a portion at its reduced size. As described above, for portions for which lower image resolution is needed, GPU 12 may render image content for those portions at a size smaller than a size of the portions. In examples described in this disclosure, GPU 12 may store this smaller-sized image content in system memory 10. For portions where full resolution is desired (e.g., portions where the user is looking or should be looking), GPU 12 may render image content for those portions at the same size as the size of the portions, and store the image content in system memory 10. However, because there are certain portions for which GPU 12 generated smaller-sized image content, the total amount of image content that GPU 12 needs to store in system memory 10 is reduced relative to cases where image content for all portions is rendered to the size of the portion.

The example techniques describe ways to perform foveated rendering, such as in examples where GPU 12 performs a two-pass processing scheme for graphics rendering. However, the techniques are not limited to examples where GPU 12 performs a two-pass processing scheme for graphics rendering. This two-pass processing scheme may be part of the operations that GPU 12 performs for generating image content for the eye-buffer round, as well as part of the operations that GPU 12 performs for generating image content for the warping round. However, two-pass processing for the eye-buffer round and the warping round may not be necessary in every example.

A first pass is referred to as a binning pass, in which GPU 12 determines which primitives belong to which bin (also called a tile) and which primitives are visible (e.g., generates visibility information). Bins or tiles are examples of portions of an image. In a second pass, referred to as a rendering pass, GPU 12 renders each portion (e.g., tile or bin) sequentially based on the determination of which primitives belong to which tile and the visibility of the primitives.

Such dual pass graphics processing architectures (sometimes referred to as streamout-based binning architectures) may be useful for various reasons. As one example, additional processing stages such as domain shaders, tessellation, and/or geometry shaders can be added to GPU 12, and there is efficient overlap of binning and rendering due to time-separated geometry and rasterization processing (e.g., GPU 12 may render one image while performing binning on the next surface).

In the example techniques described in this disclosure, GPU 12 may perform the binning pass, and then during the rendering pass, GPU 12 may render image content for each of the portions based on the image resolution of the image content in that portion. For instance, CPU 6 or the server providing the image content information may define the image resolutions for different portions of an image that GPU 12 is to render. In rendering a portion, GPU 12 may determine the image resolution of the image content for that portion based on the image resolution for the different portions as defined by CPU 6 or the server. GPU 12 may then render the image content that belongs to that portion based on the image resolution of the image content for that portion.

For example, the portion size of each portion may be N×N. If the image resolution of image content in a portion is to be one-quarter resolution relative to full resolution, then GPU 12 may render the image content having a pixel resolution of (N/2)×(N/2) in the N×N portion (e.g., render the image content with size (N/2)×(N/2) number of pixels). Therefore, there will be a quarter of the number of pixels in the image content that GPU 12 renders as compared to the number of pixels in the portion. GPU 12 may then repeat these steps for each portion (e.g., renders the image content in that portion based on the image resolution of the image content in that portion).

GPU 12 may output the rendered image content for a portion to local memory 14 for storage, and may similarly store the image content for each portion to local memory 14. In this example, because of the different pixel resolutions, the size of the image content for a portion may be different than the size of the portion, and the size of the image content for the different portions may be different. GPU 12 may then store the image content have the different sizes for the different portions to system memory 10.

To perform resizing, as one example, GPU 12 may texture map the image content. For example, GPU 12, CPU 6, or some other processing circuit may define a mesh. This mesh may be the same size and shape as an image portion. For instance, the mesh may be size and shape of a tile of the image. The mesh may include a plurality of primitives defined by vertices, which are points on the mesh. As an example, a mesh may be a two-dimensional rectangular mesh with the same size as that of a tile or bin. The two-dimensional rectangular mesh includes primitives defined by vertices (e.g., a triangle is a primitive having three vertices). Each vertex includes an (x,y) coordinate.

In texture mapping, GPU 12 may map vertices of primitives in a texture to primitives in the mesh. To avoid confusion, the coordinates of primitives in the texture are identified as (u,v) coordinates. GPU 12 may map a (u,v) coordinate of a vertex of a primitive in the texture to an (x,y) coordinate of a vertex of a primitive in a mesh (e.g., based on received commands that define the mapping). GPU 12 may redraw the texture primitive onto the primitive in the mesh based on the mapping.

In examples described in this disclosure, the smaller-sized image content stored in system memory 10 is an example of texture. For instance, GPU 12 may retrieve the smaller-sized image content and texture map the smaller-sized image content to the mesh, which in this case is the same size as the portion in the image that is associated with the smaller-sized image content.

There may be other ways in which resizing may be performed. As another example, GPU 12 may copy, interpolate, or average the pixel value of one or more pixels to pixels of the smaller-sized image content. For example, if the smaller-sized image content is (N/2)×(N/2), then to resize, GPU 12 may copy the pixel value of a pixel to the three neighboring pixels (e.g., the right, bottom, and right-bottom pixels), which essentially converts one pixel into four pixels. GPU 12 may perform some additional filtering, after upsampling, but such filtering is optional.

In some examples, GPU 12 may perform the resizing as part of post-processing operations. For instance, after GPU 12 generates the image content of one or more tiles, as part of post-processing, GPU 12 may apply the post-processing operations (e.g., blurring, converting to black-and-white, warping, etc.), and as part of the post-processing operations, GPU 12 may resize the image content of the one or more portions. The techniques are described with respect to warping, but may be performed in conjunction with other post-processing operations. Also, in some examples, GPU 12 may not perform the post-processing for resizing. Rather, display processor 16, or some other processing circuit, may be configured to receive the smaller-sized image content and resize prior to display.

For instance, although the above examples are described with respect to GPU 12 resizing the image content, the example techniques are not so limited. In some examples, display processor 16 may be configured to resize the image content. For instance, display processor 16 may be configured to perform the example resize operations such as copying, interpolating, or averaging described above with respect to GPU 12. Display processor 16 may not be configured to perform texture mapping in all examples, but it may be possible for display processor 16 to perform texture mapping techniques as well.

In some examples, the amount of image content that is rendered as part of the eye-buffer round, and the amount of image content that is resized as part of the warping round need not be the same. As described above, the server may send image content information that encompasses the area where the user is looking at the time the request was sent, as well as image content of surrounding areas that may not be viewable by the user, but could be viewable if the user changed the position of his or her eyes or head. Therefore, during the eye-buffer round, GPU 12 may render the image content that was received from the server, including image content of surrounding areas that may not be viewable by the user. For example, the image content received includes a first part of image content that is viewable by the user, and a second part of the image content of surrounding areas that are not viewable by the user. In some examples, GPU 12 may use the foveation techniques described in this disclosure to render the image content in the non-viewable surrounding areas at a smaller size, in addition to any other portions in the image content that can be rendered to a smaller size.

During the warping round, GPU 12 may only need to render the portions that are actually viewable to the user. Therefore, the amount of image content that GPU 12 needs to retrieve from system memory 10 is reduced because GPU 12 does not need to retrieve all of the image content from the eye-buffer round but only that which is now viewable. As described above, during the eye-buffer round, GPU 12 may have rendered image content to a smaller-size, and stored that smaller-sized image content to system memory 10. Then, during the warping round, GPU 12 may retrieve some or all (e.g., subset) of that smaller-sized image content from system memory 10, which means that the amount of image content GPU 12 needs to retrieve during the warping round is further reduced.

GPU 12 may use texture mapping to resize the retrieved image content. However, the resizing does not necessarily mean that GPU 12 resizes the image content back to the size it was rendered during the eye-buffer round, although such resizing is possible. GPU 12 may resize the image content back to a size needed to fill in the image of the image content that the user is actually viewing.

For example, during the eye-buffer round, GPU 12 may have rendered the received image content at different sizes. GPU 12 may have rendered portions of the image content at sizes smaller than the size of the associated portion in the image content. GPU 12 may not have rendered all portions at different sizes, but may have rendered some of the portions at different sizes. GPU 12 may then store the rendered image content having the different sizes in system memory 10.

As part of the warping round, GPU 12 may retrieve the rendered image content, which was rendered at different sizes. In some examples, GPU 12 may need to retrieve all of the rendered image content or may need to retrieve only a subset of the rendered image content based on the position of the user's head. GPU 12 may then resize the rendered image content to generate the image that the user views.

The amount by which GPU 12 resizes the rendered image content may be a function of the size of the image. For example, GPU 12 may resize the image content so that it fills in the image, and there are no holes in the image. Accordingly, the amount by which GPU 12 resizes may be variable. As described, in some examples, GPU 12 may use texture mapping techniques to perform the resizing.

Because the techniques described in this disclosure may be performed by different example circuits, the technique described in this disclosure may be performed by processing circuitry that includes one or more of fixed-function circuitry and programmable circuitry. Examples of the processing circuitry include one of or any combination of CPU 6, GPU 12, display processor 16, and pose monitor circuit 19. For ease of description, the techniques described in this disclosure are generally described with respect to GPU 12. However, such description should not be considered as limiting the example techniques to GPU 12. Rather, the techniques described in this disclosure may be performed individually or in combination by various processing circuitry.

In general, GPU 12 may determine that a first portion of an image that is to be displayed is to include image content having a first image resolution that is less than an image resolution for one or more other portions of the image. For instance, there may be certain portions in the image that are blurrier or generally less sharp than other portions in the image. For binning-based architecture, one example of a portion is a tile in the image.

GPU 12 may render the image content for the first portion at a size that is smaller than a size of the portion, based on the image resolution of the image content in the first portion, to generate smaller-sized image content that is associated with the first portion. For example, GPU 12 may determine that the image resolution for a first portion is 1/16th of the full resolution, and render image content for the first portion having a pixel resolution of (N/4)×(N/4) (e.g., size of (N/4)×(N/4)), where N×N is the size of the portion, and therefore, (N/4)×(N/4) is smaller than N×N.

In some examples, GPU 12 may store the smaller-sized image content in system memory 10. For example, rather than resizing prior to storage in system memory 10, GPU 12 may store the smaller-sized image content in system memory 10, in what is referred to as sparse storage, which requires fewer bits to be transferred from GPU 12 to system memory 10 and promotes memory bandwidth on bus 20. GPU 12, or display processor 16, may retrieve the smaller-sized image content from system memory 10, and resize the smaller-sized image content back to the size of the first portion of the image.

There may be various ways in which GPU 12 determines the image resolution of different portions of the image. As one example, CPU 6 may define the pixel resolutions for each portion because when the portions are resized, the resulting image resolution will be the image resolution for those portions. In this example, the pixel resolutions and the image resolutions may be the same (e.g., having a pixel resolution of (N/2)×(N/2) for a tile is effectively the same as defining the image resolution to be a quarter image resolution). As another example, CPU 6 may define the image resolutions for the portions of the image. CPU 6 may define a shape (e.g., rectangle, triangle, oval, or some other polygon) and its coordinates, and may define the image resolution for the portion either in absolute terms (e.g., number of pixels that should be rendered for that portion prior to upsampling) or relative terms (e.g., some factor of a full image resolution). As an example, CPU 6 may define bands of resolutions (e.g., bands having different levels of foveation). For the center of the image, CPU 6 may define a circle having no foveation (e.g., full image resolution), for a circular band (e.g., ring) around the circle, CPU 6 may define a quarter resolution, and so forth, as a way to define different resolutions (e.g., amount of foveation) for different portions of the image. In some examples, CPU 6 may receive from the server information indicating the image resolutions for the different portions.

CPU 6 may output information about the shape and location of the portion having the particular image resolution. GPU 12 may determine the image resolution for the image content in a portion based on the information of the shape and location of the different portions of the image and the location of the portion in the image.

In some cases, rather than CPU 6 defining the size and shape of an image portion and a particular image resolution for that portion, GPU 12 may be configured to define the size and shape of an image portion and its image resolution. For example, GPU 12 may be configured to define a circle with a radius R in the center of the image as having a first image resolution, a ring with width W0 around the circle as having a second image resolution, a ring width W1 around the ring with width W0 as having a third image resolution, and so forth. Other possible ways to define the image resolution are possible and the example techniques should not be considered limited to these examples. Also, rather than ring, an oval or rectangular, or other non-circular rings are possible.

In binning-based examples, the size and/or shape of an image portion having a particular image resolution may not be the same as the size and/or shape of a tile. For example, assume that CPU 6 defines an image portion as an oval that partially fits within a tile. In this example, CPU 6 may define the oval image portion within the tile as having a first resolution that is less than a second resolution for the remaining image portion within the tile.

In one or more examples, GPU 12 may render image content such that image content in a tile has the same image resolution throughout (e.g., all the image content in a tile has the same image resolution). Although CPU 6 may have defined two different resolutions for image content in the same tile (e.g., first resolution and second resolution), GPU 12 may render image content such that the pixel resolution of the image content in that tile is uniform. Accordingly, in this example, GPU 12 may determine whether to render the tile at the first resolution, the second resolution, or some other resolution that is uniform for the tile.

In cases where the image portion having a particular image resolution does not encompass the entire tile, GPU 12 may utilize various factors to determine the resolution at which to render the image content of that tile. As one example, GPU 12 may determine the portion of the image content that encompasses a majority or plurality of the tile, determine the image resolution for that portion, and render the image content of the tile at a pixel resolution such that when the image content is upsampled the image resolution of that image content is equal to the determined image resolution. As another example, GPU 12 may determine the portion of the image content in the tile having the highest resolution, determine the image resolution for that portion, and render the image content of the tile at a pixel resolution such that when the image content is upsampled the image resolution of that image content is equal to the determined image resolution. As another example, GPU 12 may determine an average or weighted average (e.g., larger portions are weighted more heavily) of the different image resolutions of the different image portions within the tile to determine an average image resolution, and render the image content of the tile at a pixel resolution such that when the image content is upsampled the image resolution of that image content is equal to the determined average image resolution. There may be other ways in which GPU 12 determines the image resolution for a tile, and the techniques should not be considered limited to the above examples.

In one or more of the above examples, the image resolutions for certain image portions may be different than the image resolution defined by CPU 6. For example, in the above example, for a tile there was image content having a first image resolution (e.g., oval of image content) that is less than the image content having a second image resolution (e.g., the remaining portions of the tile). If GPU 12 or CPU 6 determines that the image content for the tile should have an image resolution equal to the second image resolution, then although CPU 6 defined the oval of image content as having the first image resolution, the actual generated image resolution for the oval of image content may be equal to the second image resolution. Conversely, if GPU 12 or CPU 6 determines that the image content for the tile should have an image resolution equal to the first image resolution, then although CPU 6 defined the other portions of the tile excluding the oval of image content as having the second image resolution, the actual generated image resolution for the portions of the tile executing the oval of image content may be equal to the first image resolution.

To generate image content having a particular image resolution, GPU 12 may first render image content at a lower pixel resolution, and then resize the image content (or display processor 16 may perform the resizing). One way to render image content at a lower pixel resolution is to render image content to a size smaller than a size of the portion. One example way for GPU 12 to render image content to a size smaller than the size of a portion is to define the viewport to which GPU 12 is to render to be the smaller size. For example, if GPU 12 is to render to a size (N/2)×(N/2), where N×N is the size of the tile, then GPU 12 may define the viewport as (x,y) to ((x+N/2),(y+N/2)), where x is the x-coordinate for the top-left corner of the portion and y is the y-coordinate for the top-left corner of the portion. In some examples, CPU 6 may define the viewport, rather than GPU 12. As another example, an application executing on CPU 6 may define the viewport without any change in the size (e.g., define the viewport to be the size of the tile), and a graphics driver executing on CPU 6 or a controller of GPU 12 may then modify the command that defines the viewport to resize the viewport to the smaller size. Other possible techniques to cause GPU 12 to render image content to a size smaller than the size of the tile are possible, and the techniques should not be considered limited to the above examples.

Accordingly, the example techniques provide for a way for GPU 12 to generate foveated render image content such that different portions of an image are at different image resolutions. For instance, rather than rendering image content to snap to a portion (e.g., be the same size of a portion), GPU 12 may render image content of the portion to a size smaller than the portion generating smaller-sized image content associated with the portion, where the size to which GPU 12 renders is based on the image resolution of the image content in that portion and the size of the portion. If the size of the portion is N×N, and the image resolution is to be half the full resolution, then GPU 12 may render the image content for that portion to (N×N)(½) (i.e., (N/2)×N or N×(N/2)). In this example, the pixel resolution is N×(N/2) or (N/2)×N. Again, the pixel resolution defines the number of pixels that are rendered in a given area, and the image resolution defines the amount of detail in the image content. GPU 12 may resize the image content rendered to the smaller size so that the resulting image content is the same size as that of the portion. GPU 12 may repeat these operations for each of portions.

In some examples, the resizing does not add any new additional image content to the image, but is rather performed by texture mapping, or copying, interpolating, or averaging pixel values based on pixel values of neighboring pixels. The amount of resizing needed may be directly correlated with how blurry or sharp the portion appears. For example, a portion of image content that is 16× upsampled will appear blurrier than a portion of image content that is 4× upsampled. By rendering image content of a portion to a size smaller than the size of the portion and then resizing to the size of the portion results in image content having different image resolutions in different portions of the image.

GPU 12 or display processor 16 may be configured to resize the smaller-sized image content associated with a portion back to the size of the portion. To perform such resizing, GPU 12 or display processor 16 may be configured to determine by how much to resize the smaller-sized image content. In some examples, GPU 12 or CPU 6 may store metadata that GPU 12 or display processor 18 uses to determine by how much to resize the image content. Examples of the metadata may be information indicative of one or more of the size of the portion, the size of the smaller-sized image content, or the resolution of the portion. GPU 12 or display processor 16 may then retrieve the metadata along with the smaller-sized image content, and resize based on the stored metadata. As an example, the metadata may indicate that the size of portion is N×N, and that the size of the smaller-sized image content is (N/4)×(N/4). In this example, GPU 12 or display processor 16 may resize the image content by 16× (by four times horizontally, and by four times vertically). As another example, the metadata may indicate that the resolution of the first portion is $\frac{1}{64}^{th}$. In this example, GPU 12 or display processor 16 may resize the image content horizontally by a factor of eight, and resize the image content vertically by a factor of eight because eight times eight is 64.

In some examples, rather than or in addition to storing metadata that GPU 12 or display processor 16 use to resize the smaller-sized image content, processing circuitry (e.g., any combination of CPU6, GPU 12, or display processor 16) may re-determine the resolutions for the different portions. For instance, in some examples, the resolution of a given portion may be relative to the location where the user is or should be viewing the image content. The processing circuitry may use information indicating where the user is looking (e.g., as determined by pose monitor circuit 19) or should be looking (e.g., as determined by the application executing on CPU 6), and re-determine what the image resolutions should be. The re-determined image resolutions and the image resolutions originally determined should be the same, as the processing circuitry used the same information to determine the image resolutions. Because GPU 12 rendered image content based on the determined image resolutions, GPU 12 or display processor 16 may be able to determine by how much to resize the smaller-sized image content using the same information used by GPU 12 or CPU 6 to determine the image resolutions.

Figure 2:
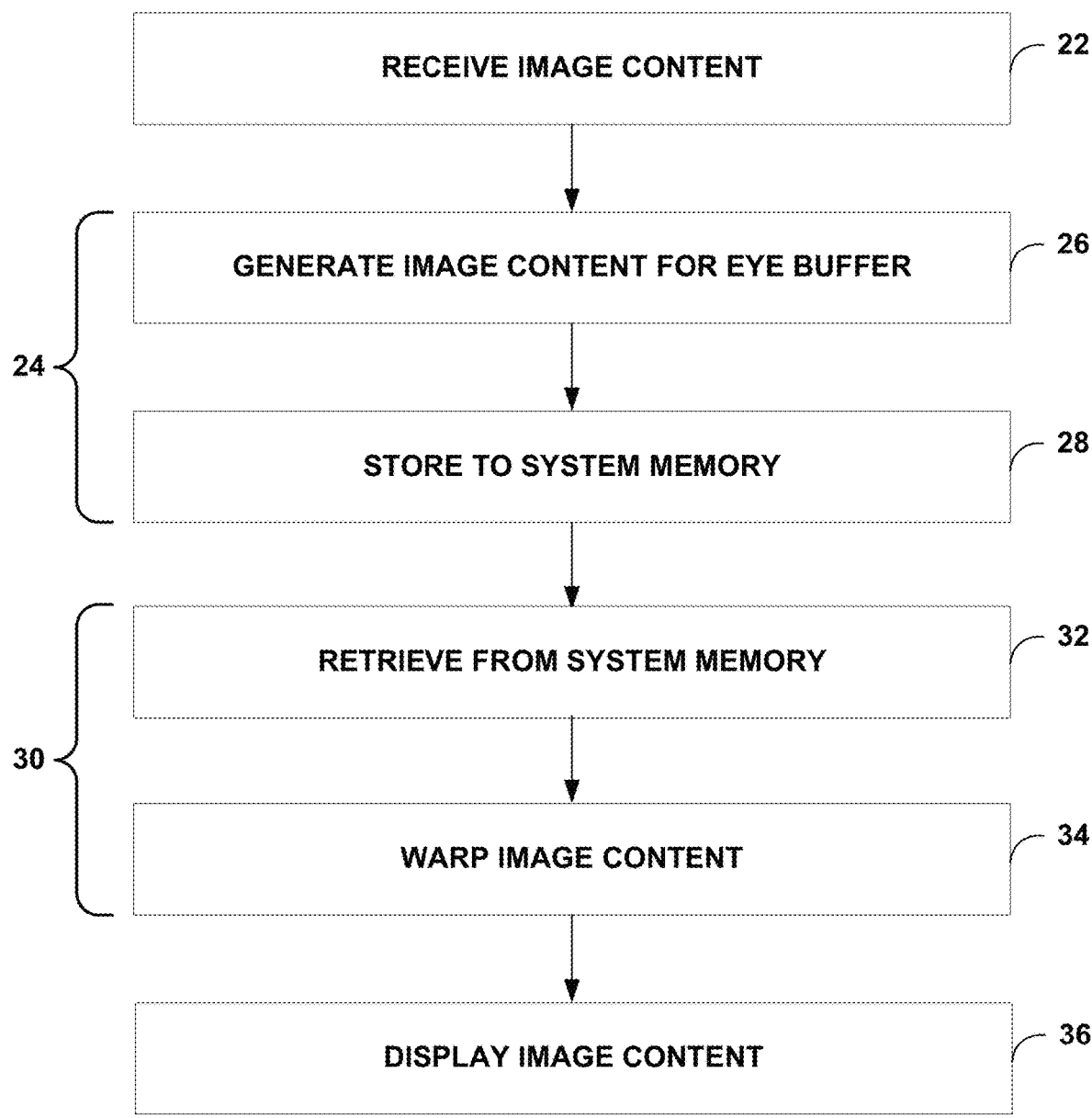
FIG. 2 is a flowchart illustrating an example operation of virtual reality (VR) rendering.

FIG. 2 is a flowchart illustrating an example operation of virtual reality rendering. For ease of understanding, the example techniques are described with respect to virtual reality rendering. However, it should be understood that the example techniques are not limited to virtual reality rendering.

CPU 6 may execute a virtual reality (VR) application that requests image content information from a server or generates the image content information for an image. The image refers to the entire image content that is to encompass display 18, sometimes also called an image frame or simply frame. In the request for the image content information or generating the image content information, CPU 6, via the application, may utilize information of where the user is viewing. In any event, GPU 12 may receive the image content information for processing and generating image content for display (22). In some examples, the amount of image content that GPU 12 receives may be more than the amount visible to the user. Such additional image content may be needed to ensure there is available image content for the user in the event the user moves his or her head.

To generate the image content for display, GPU 12 may perform operations for an eye-buffer round, illustrated by reference numeral (24). In the eye-buffer round, GPU 12 may generate image content for the eye buffer located in system memory 10 (26). Ways in which GPU 12 generates image content are described in more detail below with respect to FIGS. 3 and 5. In general, to generate the image content for the eye buffer, GPU 12 may generate image content having different sizes for different portions of the image based on the image resolutions for the different portions. As an example, if a portion is to have $1/16^{th}$ image resolution relative to a full resolution, then GPU 12 may generate image content having a size that is $1/16^{th}$ the size of image content having a full resolution (e.g., if a block is N×N, GPU 12 may render image content having a size (N/4)×(N/4)).

In rendering the image content having the smaller size, GPU 12 may initially store the image content in its local memory 14. GPU 12 may then output the image content from local memory 14 and store it to system memory 10 (28). In the outputting of the image content, GPU 12 may not change the size of the image content or otherwise increase the size of the image content. This allows GPU 12 to limit the amount of image content that needs to be stored in system memory 10.

In this example, GPU 12 may determine the image resolutions for portions of an image, render image content for one or more portions to a size smaller than sizes of the portions based on the resolutions for those portions, and store the resulting smaller-sized image content associated with the portions to system memory 10 for an eye buffer in system memory 10 as part of the eye buffer round. GPU 12 may then perform the warping round, illustrated by reference numeral 30. For instance, as part of warping the image content, GPU 12 may retrieve and resize the smaller-sized image content.

For example, GPU 12 may retrieve the smaller-sized image content from system memory 10 (32). However, not all of the smaller-sized image content may need to be retrieved because in the eye-buffer round, GPU 12 may have rendered more image content than is viewable. Because the image content was stored with smaller-sized image content, the amount of image content that GPU 12 needs to retrieve is less than the amount of image content that GPU 12 would have needed to retrieve had the image content been of the same size as the portion with which the image content is associated. GPU 12 may warp the image content (34). In some examples, GPU 12 may first resize the smaller-sized image content to the size of the portion with which it is associated to ensure there are no holes in the image, and then warp (e.g., rotate or shift) the resized image content to account for any changes in the movement of the user's head since the time when the image content information was requested. In some examples, GPU 12 may first warp the smaller-sized image content and then resize, or warp and resize the image content together.

As part of the eye-buffer round 24, processing circuitry (e.g., CPU 6 or GPU 12 in combination with pose monitor circuit 19) may have determined a position of at least one of a user eye or eyes, or user head, and may have received information indicative of resolutions for portions of the image based on the determined positions. As part of the warping round 30, the processing circuitry may, prior to resizing or after resizing, re-determine the position of the user head, and warp the smaller sized-image content (e.g., where resizing occurs after warping) or warp the resized image content (e.g., where resizing occurs before the warping) based on the re-determined positions. In examples where pose monitor circuit 19 does not determine eye or head position, as part of the eye-buffer round, the processing circuitry may still utilize determined positions of the head, as part of the warping round.

GPU 12 may store the resulting image content after the warping round 30 in system memory 10. Display processor 16 may retrieve the resulting image content from system memory 10, and cause display 18 to display the image content (36). In this way, the example techniques provide for foveation, while minimizing the amount of image content data that needs to be written to and read from system memory 10. As described above, although shown separately, display processor 16 may not be a separate processor or separate integrated circuitry. Rather, the example functions of display processor 16 may be performed at/by GPU 12.

Figure 3:
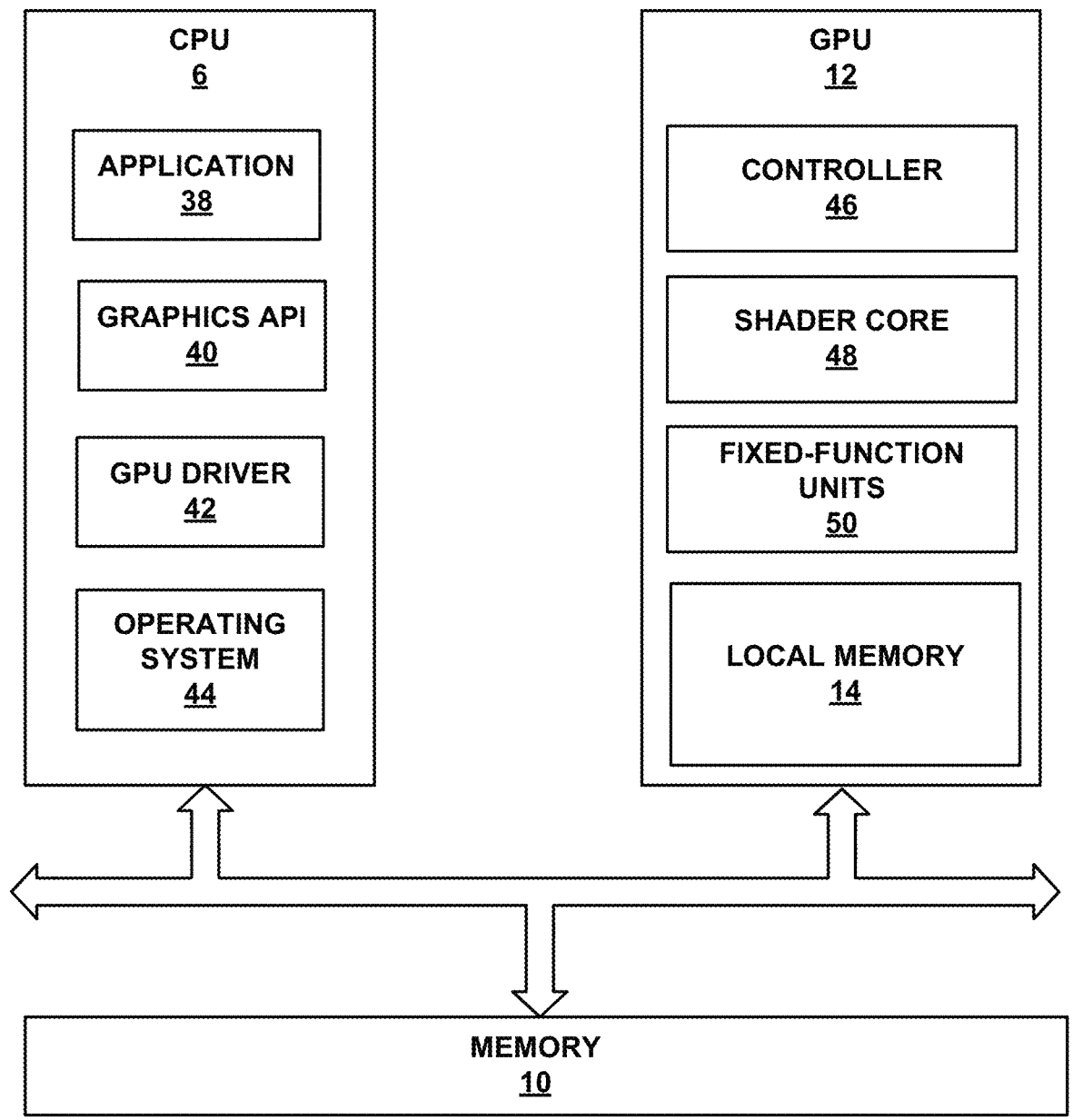
FIG. 3 is a block diagram illustrating a CPU, a GPU and a memory of the computing device of FIG. 1 in further detail.

FIG. 3 is a block diagram illustrating CPU 6, GPU 12 and memory 10 of computing device 2 of FIG. 1 in further detail. As shown in FIG. 3, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6, e.g., forming part of a system on a chip (SoC). CPU 6 is configured to execute application 38, a graphics application programming interface (API) 40, a GPU driver 42, and an operating system 44.

In the example of FIG. 3, GPU 12 includes a controller 46, shader core 48, and one or more fixed-function units 50. For ease, local memory 14 is also illustrated as being a part of GPU 12 but may be external as well.

Software application 38 may include at least some of one or more instructions that cause graphic content to be displayed or one or more instructions that cause a non-graphics task (e.g., a general-purpose computing task) to be performed on GPU 12. Software application 38 may issue instructions to graphics API 40. Graphics API 40 may be a runtime service that translates the instructions received from software application 38 into a format that is consumable by GPU driver 42. In some examples, graphics API 40 and GPU driver 42 may be part of the same software service.

GPU driver 42 receives the instructions from software application 38, via graphics API 40, and controls the operation of GPU 12 to service the instructions. For example, GPU driver 42 may formulate one or more command streams, place the command streams into memory 10, and instruct GPU 12 to execute command streams. GPU driver 42 may place the command streams into memory 10 and communicate with GPU 12 via operating system 44 (e.g., via one or more system calls).

Controller 46 is configured to retrieve the commands stored in the command streams, and dispatch the commands for execution on shader core 48 and one or more fixed-function units 50. Controller 46 may dispatch commands from a command stream for execution on one or more fixed-function units 50 or a subset of shader core 48 and one or more fixed-function units 50. Controller 46 may be hardware of GPU 12, may be software or firmware executing on GPU 12, or a combination of both.

Shader core 48 includes programmable circuitry (e.g., processing cores on which software executes). One or more fixed-function units 50 include fixed function circuitry configured to perform limited operations with minimal functional flexibility. Shader core 48 and one or more fixed-function units 50 together form a graphics pipeline configured to perform graphics processing.

Shader core 48 may be configured to execute one or more shader programs that are downloaded onto GPU 12 from CPU 6. A shader program, in some examples, may be a compiled version of a program written in a high-level shading language (e.g., an OpenGL Shading Language (GLSL), a High Level Shading Language (HLSL), a C for Graphics (Cg) shading language, etc.). In some examples, shader core 48 may include a plurality of processing units that are configured to operate in parallel (e.g., a SIMD pipeline). Shader core 48 may have a program memory that stores shader program instructions and an execution state register (e.g., a program counter register) that indicates the current instruction in the program memory being executed or the next instruction to be fetched. Examples of shader programs that execute on shader core 48 include, for example, vertex shaders, pixel shaders (also referred to as fragment shaders), geometry shaders, hull shaders, domain shaders, compute shaders, and/or unified shaders.

Fixed-function units 50 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 50 may include, for example, processing units that perform raster operations (e.g., depth testing, scissors testing, alpha blending, etc.).

GPU driver 42 of CPU 6 may be configured to write the command streams to memory 10, and controller 46 of GPU 12 may be configured to read the one or more commands of command streams from memory 10. In some examples, one or both of command streams may be stored as a ring buffer in memory 10. A ring buffer may be a buffer with a circular addressing scheme where CPU 6 and GPU 12 maintain synchronized state variables associated with the writing of data to and reading of data from the ring buffer. For example, if the first command stream is a ring buffer, each of CPU 6 and GPU 12 may store a write pointer indicating the next address to be written to in the ring buffer, and a read pointer indicating the next address to be read from in the ring buffer.

When CPU 6 writes a new command to the ring buffer, CPU 6 may update the write pointer in CPU 6 and instruct GPU 12 to update the write pointer in GPU 12. Similarly, when GPU 12 reads a new command from the ring buffer, GPU 12 may update the read pointer in GPU 12 and instruct CPU 6 to update the read pointer in CPU 6. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 42 and an example GPU controller 46 will now be described with respect to FIG. 3. GPU driver 42 receives one or more instructions from software application 38 that specify graphics operations and/or general-purpose computing operations to be performed by GPU 12. GPU driver 42 places the output command stream into memory 10, which is accessible by GPU controller 46. GPU driver 42 notifies GPU controller 46 that the command stream corresponding to software application 38 is available for processing. For example, GPU driver 42 may write to a GPU register (e.g., a GPU hardware register polled by GPU 12 and/or a GPU memory-mapped register polled by GPU 12) one or more values indicating that the command stream is ready for execution.

Upon notification that the command stream is ready for execution, controller 46 of GPU 12 may determine if resources are currently available on GPU 12 to begin executing the command stream. If resources are available, controller 46 begins to dispatch the commands in the command stream.

As part of graphics processing, CPU 6 may offload certain graphics processing tasks to GPU 12. For instance, application 38 may generate attribute data for attributes of a plurality of vertices of primitives that interconnect to form a graphical object. Application 38 may store the attribute data in a vertex buffer in memory 10. GPU driver 42 may instruct controller 46 to retrieve the attribute data for the attributes of the vertices for processing to generate graphics data for display.

In some examples, application 38 generates image resolution information that GPU driver 42 is to transmit to GPU 12. The image resolution information defines the image resolution for different portions of the image that GPU 12 is to generate. In some examples, application 38 may send a request for information indicating the image resolution information for different portions of the image.

As an example where application 38 determines the image resolutions, application 38 may define bands of image resolutions. For image content in a particular band, GPU 12 may render the image content based on the band to which the image content belongs. For example, GPU 12 may determine a band to which vertices of a primitive belong, and render the primitive based on the image resolution for the band in which the vertices of the primitive belong. For portions of high interest, application 38 may define a relatively high image resolution, and for portions of low interest, application 38 may define a relatively low image resolution.

As another example, application 38 may define image resolution for each of the vertices as part of the attribute data stored in the vertex buffer. In this example, for vertices of primitives that are located in portions with higher areas of interest (e.g., where the viewer should be viewing), application 38 may define those areas as having relatively high image resolution, and other portions with lower areas of interest as having relatively low image resolution.

The definition of the image resolution may be a ratio relative to a full image resolution. For example, the definition of the image resolution may be $\frac{1}{4}^{th}$ resolution, $\frac{1}{16}^{th}$ resolution, etc. The definition of the image resolution as a ratio (e.g., $\frac{1}{4}^{th}$, $\frac{1}{16}^{th}$, etc.) may be synonymous with defining a pixel resolution as a ratio.

For example, full pixel resolution refers to the number of pixels on display 18. If display 18 is 2048 pixels wide and 1536 pixels wide, and GPU 12 renders an image having 2048 pixels by 1536 pixels, then the image is at full pixel resolution. If, however, GPU 12 renders the image having 128 pixels by 96 pixels, GPU 12 rendered the image at $\frac{1}{256}^{th}$ pixel resolution (e.g., (2048/16)×(1536/16)). If GPU 12 then resizes the image having the $\frac{1}{256}^{th}$ pixel resolution by a factor 256×, then the resulting resized image will include 2048×1536 pixels, but the image resolution will be $\frac{1}{256}$th the full image resolution. As a comparison, the image having the $\frac{1}{256}^{th}$ pixel resolution that is resized will appear blurrier than the image having the full pixel resolution. This is because there is less detail in the resized image content since the resizing generates pixel values for pixels based on already existing pixel values instead of generating independent new pixel values.

Although the above description of the image resolution and the pixel resolution is described with respect to the full image, the same concept applies to a portion of the image.

For example, if image content is to be rendered to an N×N sized portion, and the image resolution information from application 38 indicates that the image resolution for the image content in the N×N sized portion is quarter resolution, then rendering the image content to a size (N/2)×(N/2) and then resizing by a factor of four results in the image content for that tile having a quarter image resolution.

In examples where application 38 defines the image resolution on a vertex basis, application 38 may define the image resolution for each primitive as additional attribute data for vertices of that primitive. Because there are a plurality of primitives in the image, there will be a plurality of image portions having different image resolutions. For example, application 38 may define that a first group of primitives are to be at a first image resolution, a second group of primitives are to be at a second image resolution, and so forth, including a group of primitives that are to be at a full image resolution.

Each of the groups of primitives having the different image resolutions may form respective shapes (e.g., ovals). Accordingly, application 38 in some examples may define different image resolutions for different portions of the image, where each portion is of a particular polygonal shape (e.g., oval, rectangle, etc.). There may be various other ways for application 38 to define the image portions having the different image resolutions (e.g., including bands of image resolutions), and use of vertex attributes of vertices for the image resolution information is one example.

As described above, GPU 12 may be configured to generate VR content in two rounds: eye buffer round and warping round. For at least the eye buffer round, and possibly for also the warping round, GPU 12 may be configured to generate image content in two passes: binning pass and rendering pass. Although the example techniques are described with respect to two passes, the example techniques are not so limited.

In the binning pass, GPU driver 42 and/or controller 46 may define a size of a portion (also referred to as a bin or tile), where each portion is of size N×N (e.g., N×N number of pixels). The portions need not be square or all be the same size. For ease of description, the following is described with respect to square portions having the same size.

Controller 46 may then cause shader core 48 and fixed-function units 50 to perform respective operations to determine which primitives belong in which portion and which vertices are visible. In the rendering pass, controller 46 may cause shader core 48 and fixed-function units 50 to perform respective operations on a per-portion basis to render the image content on a portion-by-portion basis. GPU 12 stores the resulting image content in memory 10 for retrieval and display.

Part of the graphics processing includes vertex processing that is generally performed by GPU 12 executing a vertex shader on shader core 38. For instance, the vertex shader may perform coordinate conversion, lighting, shading, and other such processes on the attribute data of the attributes of each vertex. Application 38 may be bound with a vertex shader, and application 38 may issue the command via GPU driver 42 that instructs controller 46 to retrieve object code for a vertex shader for execution on shader core 48.

GPU 12 may execute the vertex shader as part of the binning pass. The vertex shader may receive vertex coordinates for the primitives as defined by application 38 and generate vertex coordinates for primitives that are part of the viewing area. A binning circuit, which may be part of fixed-function units 50, may determine to which portions each of the primitives belongs. For example, the binning circuit may receive information indicative of the size of display 18 (e.g., number of pixels horizontally of display 18 by number of pixels vertically of display 18). Based on the size of display 18, the binning circuit may convert the coordinates provided by the vertex shader into coordinates on display 18. The size of display 18 may be stored in local memory 14 or memory 10.

In addition, the binning circuit may divide the image into a plurality of portions. The image may be the size of the display 18. GPU driver 42 may define the number of portions that the binning circuit is to divide the image. Based on the number of portions and the size of display 18, the binning circuit may determine the size of each portion and the position of each portion in the image. As an example, if the size of display 18 is 100 pixels by 100 pixels, and GPU driver 42 defines that the image is to be divided into 100 tiles, then the binning circuit may determine that there are 100, 10 pixels by 10 pixel tiles arranged contiguously.

Based on the size of each portion, the position of each portion in the image, and the coordinates of the vertices on display 18, the binning circuit may determine which vertices belong to which portion. For example, keeping with the 100, 10 pixel by 10 pixel tiles example, if the binning circuit determines that the x and y coordinates for a vertex are 25 and 35, respectively, then the binning circuit may determine that this vertex is located at portion (2, 3). In this example, 25/10 indicates that the portion is located second portion from the right, and 35/10 indicates that the portion is located third portion from top.

In some examples, two vertices outputted by the vertex shader may be located at the same x, y coordinate, but at a different z coordinate. The z coordinate indicates depth. A depth test circuit may receive coordinate information from the binning circuit of which vertices belong to which tiles. For vertices having the same x, y coordinate, the depth test circuit may determine which vertex is occluded by which vertex based on the respective z coordinates. If a vertex or primitive is occluded, that vertex or primitive may be discarded from further processing. For instance, the depth test circuit may not output attribute data for vertices or primitives that are occluded to memory 10. The order of operation of the binning circuit and depth test circuit is provided as an example, and the order of operation may be reversed. The depth test circuit may first determine whether vertices or primitives are occluded and remove those vertices from further processing, and the binning circuit may then determine to which tiles vertices belong.

In either example (e.g., binning and then depth test or depth test and then binning), the result may be information indicating to which tiles the primitives belong. Also, the remaining vertices (e.g., those not discarded) may be vertices that contribute to the final image. These operations may conclude the binning pass. Accordingly, at the end of the binning pass, there is visibility information of which vertices belong to which portions (e.g., which vertices that contribute to content in the image belong to which portions).

GPU 12 may store the information of which vertices belong to which portion in memory 10, possibly as additional attribute data. For example, each portion may be associated with a position in a digital value (e.g., first position is associated with last bit in digital value, second portion is associated with second to last bit in digital value, and so forth). For each vertex, the binning circuit may determine a digital value that indicates the portion to which that vertex belongs. A digital one for the bit, which is associated with a particular portion, in the digital value of a vertex means that the respective vertex belongs to that portion. For example, assume nine portions, which means that for each vertex that belongs to the first portion, the binning circuit may store the following digital value as additional attribute data for that vertex: 000000001. In this example, the first portion is associated with the last bit in the digital value, and therefore, that bit is a digital (e.g., binary) one and the rest are a digital zero values for vertices that belong to the first portion. If the vertex belonged to the third portion, the binning circuit may store the following digital value as additional attribute data for that vertex: 000000100 (e.g., the third from last digital bit is a digital one because the third from last digital bit is associated with the third portion).

Next for the rendering pass, GPU 12 may render the primitives formed by the vertices in each of the portions. GPU 12 may perform such rendering on a portion-by-portion basis. For instance, GPU 12 may render the image content of the first portion, then the second portion, and so forth. At the conclusion of writing the image content of first portion, GPU 12 may store the image content in local memory 14, and repeat these operations until there are no more portions to render.

To render image content, GPU 12 determines pixel values (e.g., color and opacity) for each of the pixels in each of the portion. One way in which GPU 12 renders the pixels in each of the portions is by defining the area within the portion to which the image content is to be rendered. If GPU 12 renders the image content in each of the portions to the size of the portion, GPU 12 may render the image content to full pixel resolution.

However, in accordance with the techniques described in this disclosure, rather than rendering the image content of a portion to the size of the portion, GPU 12 may render the image content to a size smaller than the portion. The size to which GPU 12 renders the image content of a portion may be based on the image resolution of the image content in the portion.

As described above, application 38 may define the resolution bands. At the conclusion of the operations of the vertex shader, GPU 12 may determine to which band vertices in the tile belong. The resolution bands to which the vertices belong may define the image resolution for the image content in that tile.

In some examples, application 38 may define the image resolution for the vertices. During the operations performed by the vertex shader, the vertex shader may keep the definition of the image resolution of vertices assigned to the vertices. Then during the rendering, for all the pixels that belong to the primitive defined by its vertices, GPU 12 may render these primitives to a size that is proportional to the size of the tile based on the defined image resolution.

For example, if a majority or plurality of vertices within a first tile fall in the band having a quarter image resolution or are defined as having a quarter image resolution, and the size of the tile is N×N, then GPU 12 may render the image content of the first tile to a size that is a quarter the size of the tile (e.g., (N/2)×(N/2)). In this example, the size to which GPU 12 renders the image content of the first tile is (N/2)×(N/2) which is proportional to the size of tile (e.g., proportional to N×N) and based on the defined image resolution (e.g., quarter resolution). In this example, GPU 12 may multiply the size of the tile with the ratio of the image resolution (e.g., N×N multiplied by quarter is (N/2)×(N/2)).

One example way in which GPU 12 may render the image content of the first tile to (N/2)×(N/2) is based on a defined viewport. For instance, as part of rendering the image content, GPU 12 receives a command that defines the viewport within which GPU 12 is to render the image content. For full pixel/image resolution, the viewport command (e.g., a glViewport command of OpenGL) may define the viewport to which GPU 12 renders the image content as the size of the tile (e.g., N×N). However, for a size smaller than the size of the tile that is based on the image resolution, the viewport command may define the viewport as (N/2)×(N/2).

In some examples, because application 38 may not be configured to determine to which tile various primitives will be rendered, application 38 may not be configured to issue the viewport command that defines the viewport for that tile to a size smaller than that tile. Therefore, application 38 may issue the viewport command without instructing GPU 12 to render the image content to a smaller size.

GPU driver 42 may capture the viewport command issued by application 38 and modify the viewport command to define the viewport to a smaller size that is proportional to the size of the tile and the defined image resolution. For example, as described above, GPU driver 42 may be tasked with outputting the commands that application 38 issues to GPU 12 that GPU 12 executes. Application 38 may define the viewport command, and GPU driver 42 may receive the viewport command and modify the viewport command to set the viewport to the actual viewport to which GPU 12 is to render the image content (e.g., modify the viewport from N×N to (N/2)×(N/2)).

Based on the defined viewport for a tile, GPU 12 may render the image content of that tile to the area defined by the viewport for that tile. For example, GPU 12 may rasterize the primitives and define the pixels within the primitives based on the defined viewport size. For each pixel within the primitive, GPU 12 may execute a pixel shader that determines the pixel values for respective pixels. The pixel shader may output the resulting pixel values for pixels within the viewport to local memory 14.

GPU 12 may repeat these operations for each of the tiles. Accordingly, local memory 14 may store the image content for each tile. However, the size of the image content for any tile need not necessarily be the same size as the tile, and may be less than the size of the tile. For example, if the image resolution for the first tile is quarter resolution (e.g., as application 38 defining the image resolution band that happens to be in the first tile as quarter image resolution), then the size of the image content for the tile may be a quarter of the size of the first tile. If the image resolution for the second tile is one-sixteenth resolution, then the size of the image content for the tile may be a sixteenth of the size of the second tile, and so forth. This may conclude the rendering pass.

For some tiles, it may be possible that GPU 12 rendered image content to the size of those tiles. Application 38 may have defined some vertices to have full image resolution because those vertices are for primitives where the viewer should be focusing. Therefore, GPU 12 may render some tiles to full pixel resolution (e.g., to a size equal to the size of the tile) because the image content in those tiles is to have full image resolution and may render some tiles to less than full pixel resolution (e.g., to a smaller size than size of the tile) because the image content in those tiles is to have less than full image resolution (e.g., one-half, one-quarter, one-eighth, one-sixteenth image resolution, and so forth).

In the above examples, application 38 is described as defining the resolutions for each tile (e.g., portion). However, in some examples, another device (e.g., server from which the image content information is received) may define the resolutions for each tile. It may be possible for CPU 6 to execute another application that defines the resolutions. There may be various ways in which to define the resolutions of the portions, and the techniques are not limited to one specific way in which to define the resolution.

For a tile (e.g., portion), controller 46 may output the smaller-sized image content (e.g., smaller than the size of the portion with which the image content is associated) from local memory 14 to system memory 10. In this way, controller 46 may store lower resolution rendering directly from local memory 14 to system memory 10.

However, later, the smaller-sized image content may need to resized to the size of the portion with which it is associated. For example, to display the image content, GPU 12 or some other processing circuit may resize the image content back to the size of the tile. Otherwise, the image content will appear shifted off to a corner, and a large black gap will appear in the middle.

To resize, in some examples, controller 46 or GPU driver 42, or some other processing circuit, may store information that can be used to resize. As an example, controller 46, GPU driver 42, or application 38 may store metadata for quality level per foveated region (e.g., storing metadata indicative of one or more of the size of the portion, a size of the smaller-sized image content, or the resolution of the image content), and may store this metadata when the foveated rendering parameters are set (e.g., by application 38, the server, or CPU 6). For finer granularity foveation (e.g., where the portion is not set to the size of the tile), controller 46, GPU driver 42, or application 38 may store the quality level for each portion. This results in saving bandwidth in relation to shader reduction in non-sparse foveated. For example, sparse foveation saves bandwidth in relation to an amount of pixel reduction achieved with bin-based foveated rendering.

The following is one example way in which metadata may be stored. The techniques should not be considered limited to these example techniques.

In some examples, controller 46, GPU driver 42, or application 38 may use two bits in each of x and y to allow for scaling down to $1/8^{th}$ per axis. For example, 0x0 for a portion means no foveation, and full resolution. 0x1 for a portion means ½ size in x, no scale in y. 0x4 means no scaling in x, and ½ size in y. 0xF means ⅛ size in x, and ⅛ size in y. For bin-based foveation, using this example scheme uses up to four bits per portion (e.g., tile or bin), which means that the memory needed to store the metadata is 4 bits*number of portions. For quad-based foveation, this results in 1024*1024/(2*2)*4 bits/8 bits per byte=128 k for 1024 eye buffer, which is a 3% increase over 1024*1024*4 bytes eye buffer.

In some examples, there may be not any need to store the metadata. Rather, prior to resizing, controller 46 or application 38 may re-determine the resolutions for each of the portions. For example, to determine the resolutions of each of the portions, controller 46, application 38, or the server may determine the resolutions based on the eye positions. In some examples, application 38 may have determined the resolutions based on information of where the user is supposed to be looking. In any of these examples, application 38, the server, or controller 46 may use the same information previously used to determine the resolutions to re-determine the resolutions. For instance, application 38 or controller 46 may determine a size of the smaller-sized image content after storing the smaller image content in the system memory. In such examples, the resizing may be based on the determination of the size of the smaller-sized image content. In such examples, the scale factors could be calculated from foveated parameters instead of stored. This might allow continuous quality levels (e.g., not set percentages of half, quarter, etc.).

As described above, one example way to resize is with texture mapping. Fixed-function units 50 include hardware texture mapping circuitry. However, texture mapping may be performed via a shader executing on shader core 48. For purposes of illustration, the texture mapping is described with respect to texture mapping circuitry, which may be part of fixed-function units 50.

For texture mapping, system memory 10 or local memory 14 may store a mesh that includes a plurality of points, where the mesh is the size of the portion. The texture mapping circuitry may receive instructions indicating vertices in the smaller-sized image content (which in this case is a texture of the texture mapping) associated with a point in the mesh. However, because the smaller-sized image content is smaller in size relative to the mesh, there are fewer pixels in the smaller-sized image content then in the mesh. Accordingly, there may need to scale in the texture coordinates (e.g., coordinates in the smaller-sized image content) to line up the texture coordinates with coordinates in the mesh. In some examples, the instructions that the texture mapping circuitry receives may be such that texture fetch scales texture coordinates by quality level in each direction before fetching the image content from system memory 10. In this example, the scaling may be done before any filtering, which may avoid seams in the image content.

The following is example of instructions that a shader program may execute on shader core 48 to generate the coordinates for the texture mapping circuitry that the texture mapping circuitry uses to fetch image content. In some examples, rather than a shader program, some other hardware circuitry or the texture mapping circuitry may be configured to perform the following operations to determine coordinates for fetching.

In the following, the shader program may need to rescale the coordinates from where image content is retrieved because when the image content is stored from local memory 14 to system memory 10, the image content may be stored in sparsely populated regions of system memory 10. For instance, and as described in more detail below with respect to FIGS. 4A and 4B, system memory 10 may be allocated with memory space to store image content for an entire portion. However, because the smaller-sized image content is stored, not all of the entire memory space allocated for a portion is used, resulting in the allocated memory space being sparsely populated. To accommodate for the image content being sparsely stored, the following instructions scale the coordinates from which to retrieve the image content.

```
float binOffsetU = binWidth / surfaceWidth;
float binOffsetV = binHeight / surfaceHeight;
float binX = floor (vTexCoords.x / binOffsetU);
float binY = floor (vTexCoords.y / binOffsetV);
float scaleX = scaleFactorX[binX,binY];
float scaleY = scaleFactorY[binX,binY];
float currentOffsetU = (binOffsetU * binX);
float currentOffsetV = (binOffsetV * binY);
float texCoordOffsetU = currentOffsetU -
   (currentOffsetU / scaleX);
float texCoordOffsetV = currentOffsetV -
   (currentOffsetV / scaleY);
newTexcoord = (vTexCoords /
   vec2(scaleX, scaleY)) + vec2(texCoordOffsetU,
   texCoordOffsetV);
```

Accordingly, FIG. 3 describes an example where GPU 12, based on information from application 38 as one example, determines that a portion of an image that is to be displayed includes image content having a first resolution less than resolutions for one or more other portions of the image. GPU 12 may render the image content for the first portion at a size that is smaller than a size of the first portion based on the first resolution to generate smaller-sized image content that is associated with the first portion, and store the smaller-sized image content in system memory 30. In some examples, GPU 12 may perform such operations as part of the eye-buffer round.

For instance, GPU 12 may receive image content for the image that is viewable by a user and image content of surrounding areas that is not viewable by the user. In this example, the received image content includes the first portion of the image. For example, to ensure there is sufficient image content for the warping, GPU 12 may receive not only image content for the parts that are viewable to the user, but also receive image content for additional surrounding areas in case the user moves his or her head and this additional image content is needed for display. The first portion that GPU 12 renders at a smaller size and stores is part of the received image content.

As part of the eye-buffer round, GPU 12 may render the received image content at different sizes. For instance, to perform the foveation, GPU 12 may determine the different resolutions for the different portions of the received image content, and render the received image content at different sizes based on the determined resolutions. Such rendering of the received image content at different sizes includes the rendering of the image content for the first portion to generate the smaller-sized image content. GPU 12 may store the rendered image content at the different sizes in system memory 10, including storing of the smaller-sized image content in system memory 10.

As part of the warping round, GPU 12 may retrieve some or all of the rendered image content (e.g., a subset of the image content). For example, during the warping round, based on any changes to the position of the head of the user, not all of the image content rendered during the eye-buffer round is needed. Accordingly, GPU 12 may need to retrieve only the image content needed to perform the warping, which may be some or all of the rendered image content rendered (e.g., as subset of the image content) as part of the eye-buffer round. In this example, GPU 12 may retrieve the smaller-sized image content from system memory 10 because the smaller-sized image content, generated as part of the eye-buffer round, is part of the rendered image content. GPU 12 may resize (e.g., using texture mapping) the retrieved image content to generate the image. For example, part of resizing the retrieved image content includes resizing the smaller-sized image content back to the size of the first portion of the image.

As an example to illustrate the example techniques, assume that based on eye position and/or head position, the server sent 3 k by 3 k bytes of image content to device 2; however, the amount of image content that is actually viewable is 1 k by 1 k bytes of image content. In this example, device 2 received more than a viewable amount of image content in the event that the viewer changed the position of his or her head. As part of the eye-buffer round, GPU 12 may render the 3 k by 3 k bytes of image content. However, rather than generating the 3 k by 3 k bytes of image content data, GPU 12 may render portions of the received image content at different sizes to reduce the total number of bytes. The portions that are rendered at different, smaller sizes may be based on information from application 38, and may be smaller relative to the size of the portion with which the image content is associated. As an example, assume that GPU 12 stored 2 k by 2 k bytes of image content data because there were fewer bytes to store relative to the 3 k by 3 k bytes of image content, resulting from the foveation.

As part of the warping round, GPU 12 may not need to retrieve the whole 2 k by 2 k bytes of image content, but may instead retrieve a subset of the image content. GPU 12 may then resize the image content back to the size needed to generate an image. In this example, the size of the image may be 1 k by 1 k because that is the amount of image content that is viewable by the user.

In some examples, it is possible to retrieve all of the image content rendered as part of the eye-buffer round rather than just a part of the image content. For example, assume that with the foveation, GPU 12 was able to reduce the 3 k by 3 k bytes of image content to 0.5 bytes by 1 byte of image content. In such cases, GPU 12 may resize the image content to the size needed to generate the image (e.g., 1 k by 1 k). Therefore, the resizing of the image content can be set to any size that is sufficient to fill in the image content of the image so there are not holes in the image.

Accordingly, GPU 12 may receive a first part of the image content for the image that is viewable to by a user (e.g., 1 k by 1 k of the 3 k by 3 k image content received in the above example), and a second part of the image content of surrounding areas that are not viewable by the user (e.g., the remaining 2 k by 2 k image content of the 3 k by 3 k image content). As part of the eye-buffer round, GPU 12 may render the received first and second parts of the image content at different sizes (e.g., based on the resolution). GPU 12 may store the rendered first and second parts of the image content having different sizes in system memory 30.

As part of the warping round, GPU 12 may retrieve a subset (e.g., some or all) of the rendered first and second parts of the image content. For example, GPU 12 may retrieve some of the first part of the image content, or some of the second part of the image content, or some of both the first and second part of the image content. GPU 12 may then resize the subset of the rendered first and second parts of the image content to generate the image.

Figure 4A:
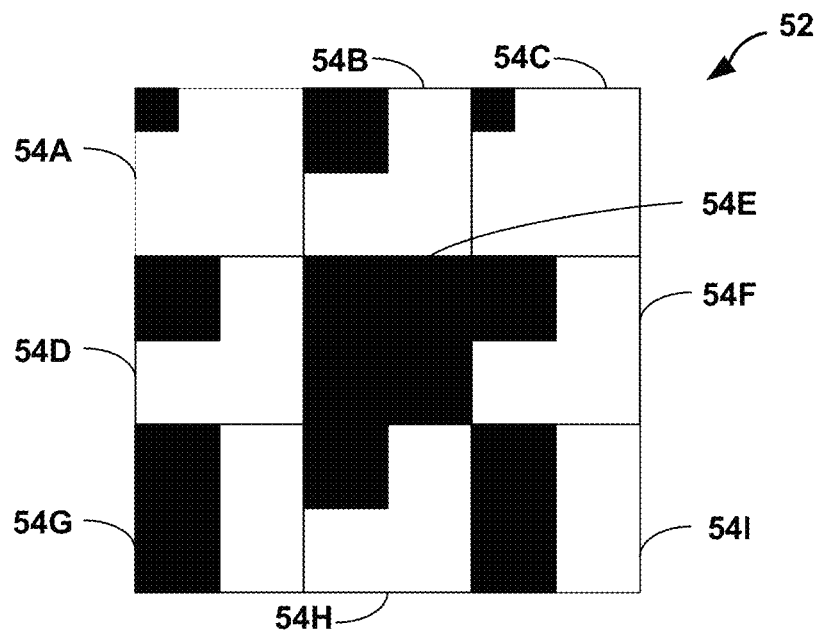
FIGS. 4A and 4B are conceptual diagrams illustrating storage of image content of an image in system memory.
Figure 4B:
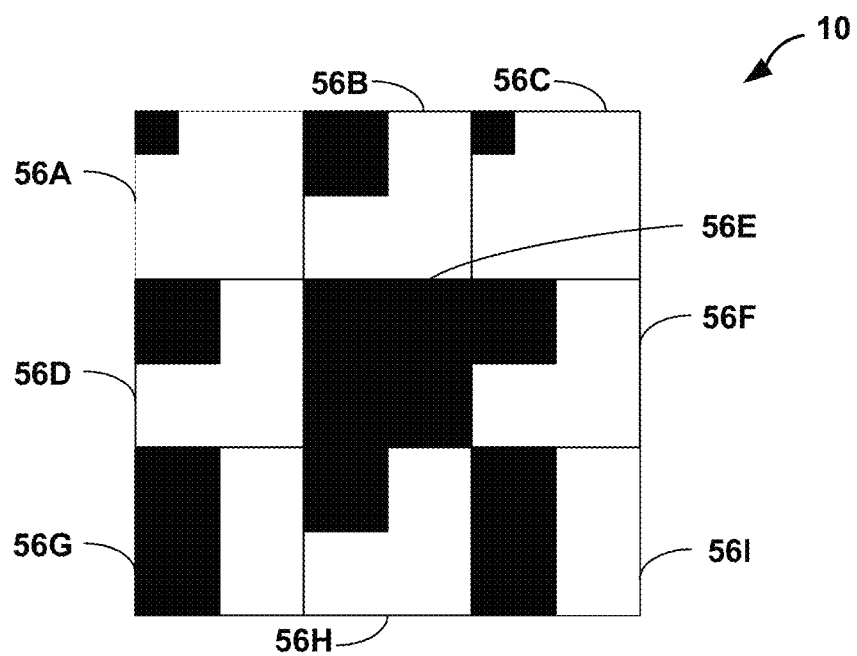

FIGS. 4A and 4B are conceptual diagrams illustrating storage of image content of an image in system memory. FIG. 4A illustrates image 52. Application 38 may have determined the image resolutions for different portions of image 52. For example, for portion 54E, application 38 may have determined the image resolution to be full resolution (e.g., no foveation), and therefore portion 54E is illustrated as fully dark. For instance, GPU 12 may render image content associated with portion 54E to the same size as portion 54E. For portions 54A and 54C of image 52, application 38 may have determined $\frac{1}{16}^{th}$ resolution, and therefore $\frac{1}{16}^{th}$ of portions 54A and 54C are illustrated as fully dark. For instance, GPU 12 may render image content associated with portions 54A and 54C at $\frac{1}{16}^{th}$ the sizes of portions 54A and 54C.

For portions 54B, 54D, 54F, and 54H, application 38 may have determined $\frac{1}{4}^{th}$ resolution, and therefore $\frac{1}{4}^{th}$ of portions 54B, 54D, 54F, and 54H are illustrated as fully dark. For instance, GPU 12 may render image content associated with portions 54B, 54D, 54F, and 54H at $\frac{1}{4}^{th}$ the sizes of portions 54B, 54D, 54F, and 54H. For portions 54G and 54I, application 38 may have determined one-half resolution, and therefore half of portions 54G and 54I are illustrated as fully dark. For instance, GPU 12 may render image content associated with portions 54G and 54I at one-half the sizes of 54G and 54I. One-half here is illustrated as scaling image content along the y-axis, but scaling to half along x-axis is also possible.

Figure 8:
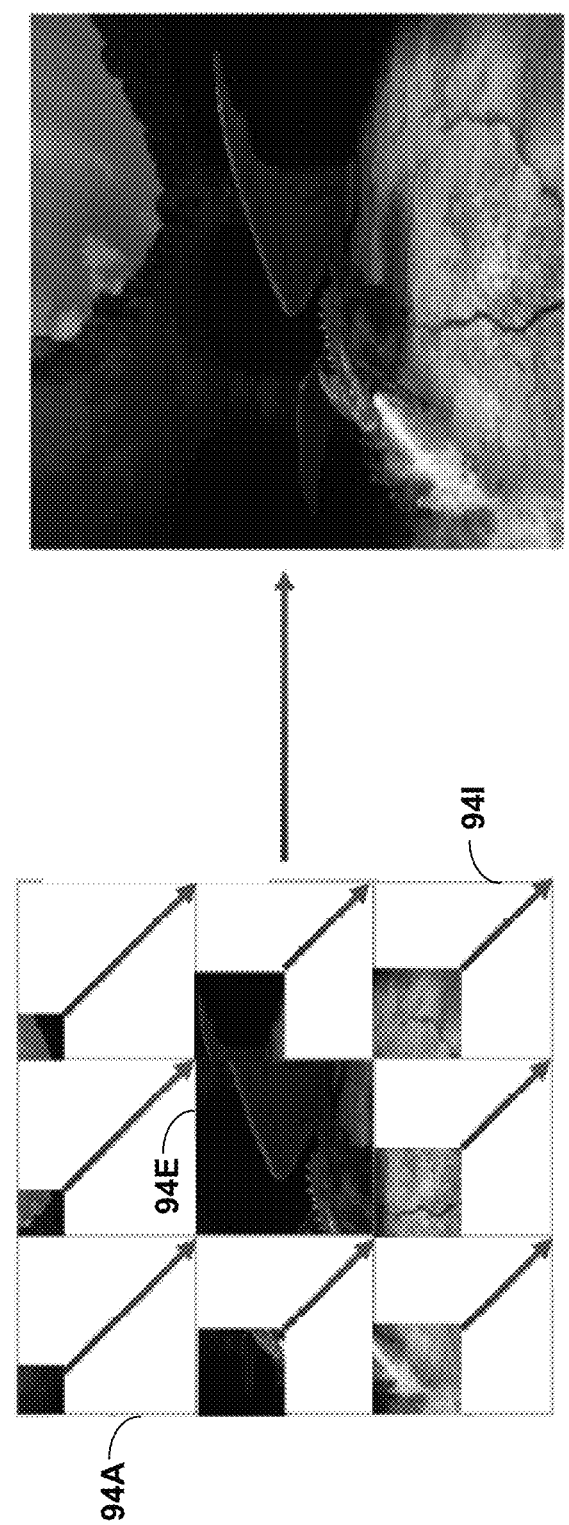
FIG. 8 is a pictorial diagram illustrating one example of foveation rendering.

One example of the image content generated from GPU 12 rendering image content with portions 94A-94I is illustrated in FIG. 8. Portions 94A-94I may be similar to portions 54A-54I of FIG. 4. In FIG. 8, the image content of portion 94A is rendered to only $\frac{1}{16}^{th}$ the size of portion 94A because application 38 may have determined $\frac{1}{16}^{th}$ resolution for portion 94A. The rendered image content in portion 94A is an example of a smaller-sized image content because the rendered image content includes the same image content of the image that would belong to portion 94A but at $\frac{1}{16}^{th}$ the size. For portion 94E, the image content of portion 94E is rendered to the entire size of portion 94E because application 38 may have determined full resolution for portion 94E. For portion 94I, the image content of portion 94I is rendered to $\frac{1}{4}^{th}$ the size of portion 94I because application 38 may have determined $\frac{1}{4}^{th}$ resolution. The rendered image content in portion 94I is an example of a smaller-sized image content because the rendered image content includes the same image content of the image that would belong to portion 94I but at $\frac{1}{4}^{th}$ the size.

For ease, FIG. 8 also illustrates the resulting image if portions 94A-94I were upsampled, resulting in a foveated image content. However, in the example techniques described in this disclosure, rather than upsampling the image content in portions 94A-94I, GPU 12 may store smaller-sized image content as illustrated in portions 94A-94I in system memory 10.

FIG. 4B illustrates locations in system memory 10 where the image content of image 52 is stored. For example, locations 56A-56I in system memory 10 correspond to portions 54A-54I in image 52. In FIG. 4B, for foveated rendering, system memory 10 may be sparsely populated. For instance, not all of the memory space allocated for a portion is used, meaning that the memory space is not fully used.

For instance, because image content for portions 54A and 54C were rendered to a sixteenth of the size of portions 54A and 54C, only a sixteenth of the memory space in locations 56A and 56C is used. Because image content for portions 54B, 54D, 54F, and 54H were rendered to a fourth of the size of portions 54B, 54D, 54F, and 54H, only a fourth of the memory space in locations 56B, 56D, 56F, and 56H is used. Because image content for portions 54G and 54I were rendered to a half of the size of portions 54G and 54I, only a half of the memory space in locations 56G and 56I is used. Because image content for portion 54E was at full resolution, all of location 56E is used.

Although the example is illustrated with sparsely populated storage in system memory 10, the example techniques are not so limited. In some examples, the image content of image 52 may be stored in a packed manner. For example, rather than storing the image content for portions 54 in respective locations 56, GPU 12 may store the image content in consecutive and contiguous memory locations of system memory 10 so that there are not gaps in the storage locations.

Figure 5:
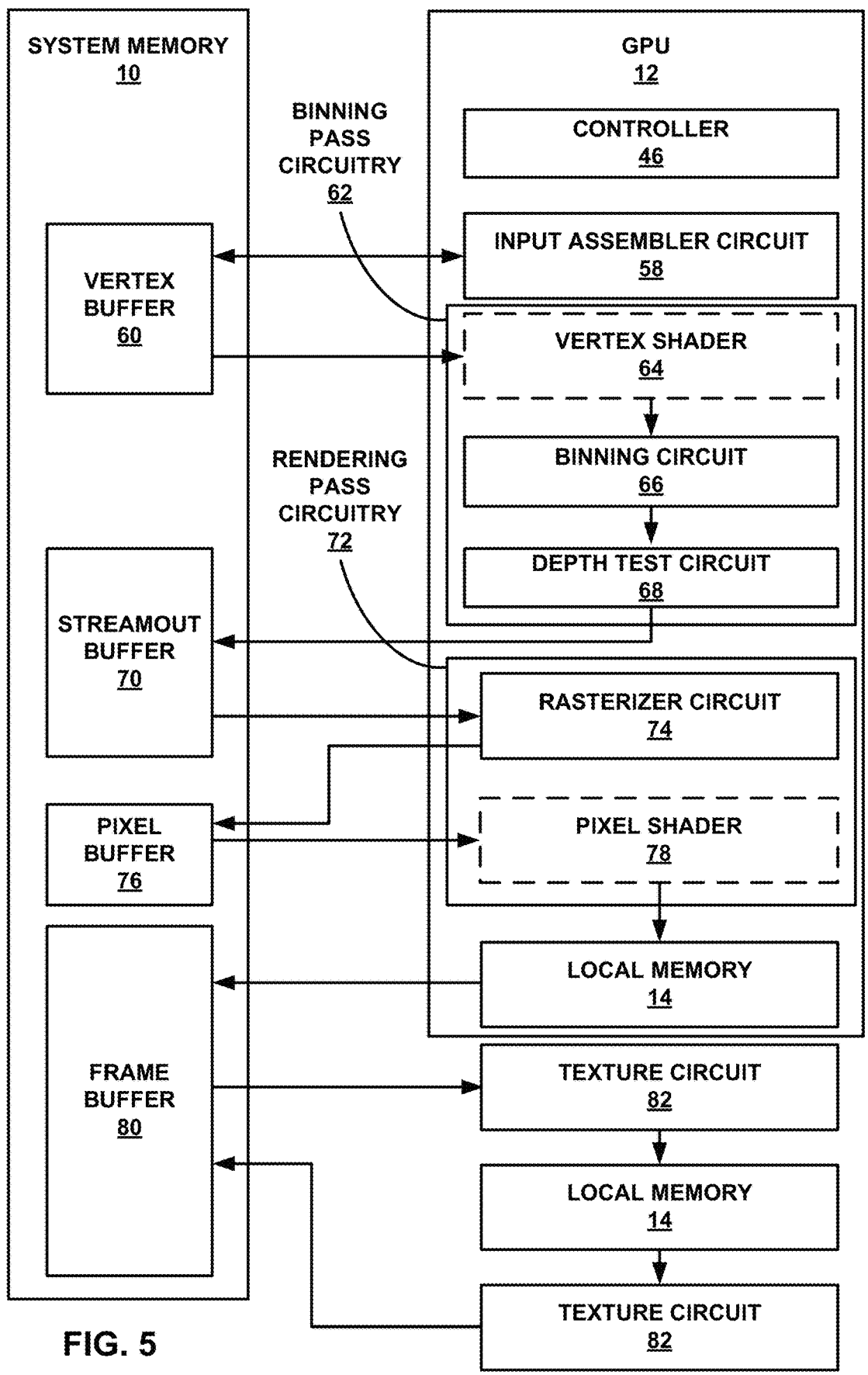
FIG. 5 is a block diagram illustrating a GPU and a memory of the computing device of FIG. 1 in further detail.

FIG. 5 is a block diagram illustrating a GPU and a memory of the computing device of FIG. 1 in even further detail. To perform graphics operations, GPU 12 may implement a graphics processing pipeline. The graphics processing pipeline includes performing functions as defined by software or firmware executing on GPU 12 and performing functions by fixed-function units that are fixed hardware configured to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

In this example, GPU 12 may include one or more of controller 46, input assembler circuit 58, binning pass circuitry 62, and rendering pass circuitry 72. Binning pass circuitry 62 includes vertex shader 64, which is illustrated in dashed lines to indicate that vertex shader 64 executes on shader core 48 (FIG. 3) of GPU 12. For example, binning pass circuitry 62 includes shader core 48 on which vertex shader 64 executes. Binning pass circuitry 62 also includes binning circuit 66 and depth test circuit 68. Rendering pass circuitry 72 includes rasterizer circuit 74, and pixel shader 78, which is illustrated in dashed lines to indicate that pixel shader 78 executes on shader core 48 (FIG. 3). In the illustrated example, local memory 14 is illustrated as internal to GPU 12 but may be external to GPU 12. GPU 12 also includes texture circuit 82 which performs resizing, and may be also used for warping image content.

Shader core 48 may execute other types of shaders as well such as a hull shader and domain shader that follow the vertex shader stage in that order, and are used for tessellation. Tessellation circuitry may also be included in one or more fixed-function units 50 for performing the tessellation. Shader core 48 may also execute a geometry shader that receives the output of the domain shader, if shader core 48 executes the domain shader, or the output of a vertex shader, if no domain shader is executed. Rasterizer circuit 74 may receive graphics data generated by vertex shader 64 or from the geometry shader (when available) or domain shader (when available).

Other configurations of the graphics pipeline are possible, and the techniques described in this disclosure should not be considered limited to the specific example illustrated in FIG. 5. For example, GPU 12 may include more stages than those illustrated, and in some examples, GPU 12 may not necessarily include all of the illustrated stages. Also, the specific ordering of the stages is provided for purposes of illustration and should not be considered limiting.

FIG. 5 also illustrates the various buffers in memory 10 used to store intermediate graphics data as the graphics data is being generated through the graphics pipeline of GPU 12. As illustrated, memory 10 includes vertex buffer 60, streamout buffer 70, pixel buffer 76, and frame buffer 80. These buffers may be part of the same larger buffer or may be separate buffers.

Application 38 may cause CPU 6 (e.g., via GPU driver 42) to output vertex data (e.g., attribute data) of vertices to vertex buffer 60. In some examples, the attribute data for the vertices may include image resolution information that indicates the relative image resolution of the primitives formed by the vertices. For example, for primitives that are for image portions where the viewer should focus, application 38 (or server) may define a relatively high level of image resolution, including full resolution. For primitives that are for image portions where the viewer should not focus, application 38 (or server) may define a lower level of image resolution (e.g., one-quarter resolution, one-eighth resolution, and so forth). In some examples, application 38 may progressively define image portions with less and less image resolution. For example, for image portions immediately neighboring image portions having full resolution, application 38 may define a one-half resolution, for image portions next to the immediately neighboring image portions, application 38 may define a one-quarter resolution, and so forth.

There may be other ways in which to define the image resolution such as a bands of resolutions. Also, application 38 need not be the only way in which image resolution is defined. In addition to or instead of application 38, some other component (e.g., GPU driver 42 or controller 46) may define the image resolution.

Input assembler circuit 58 may read vertex points of vertices from system memory 10 as defined by CPU 6, and assemble the control points to form the vertices. For instance, input assembler circuit 58 may read the coordinates, color values, and other such information. The coordinates, color values, and other such information may be commonly referred to as attributes of the vertices. Based on the attributes of the vertices, input assembler circuit 58 may determine the general layout of the primitives. Input assembler circuit 58 may be a fixed-function unit.

Vertex shader 64 may receive the attribute data for the attributes of vertices. Vertex shader 64 may perform per-vertex operations such as transformations, skinning, morphing, and per-vertex lighting. For example, application 38 may define the coordinates for the vertices of the primitives that form different objects in so-called "local coordinates." The local coordinates are three-dimensional coordinates (x,y,z), and define the coordinates in local space (e.g., relative to the object itself where the center of the object is at coordinate (0, 0, 0) as an example). Vertex shader 64 converts the local coordinates to world space via a model matrix, where the world space includes all of the objects in space that is encompassed by the image. The model matrix, sometimes referred to as a transformation matrix, translates, scales, and/or rotates the object to place where the object belongs in the larger world space. The model matrix may be defined by the developer of application 38.

Vertex shader 64 may multiply the world coordinates of the vertices with a view matrix that rotates the scene so that the objects are oriented to the viewer's point of view. Based on the viewer's point of view, some objects may appear in front of others in one point of view, and reverse in the other point of view, and the view matrix orients the objects correctly based on the viewer's point of view. As an example, a first object appears to be in front of a second object if the viewer is viewing the objects from a first point of view, but from the opposite point of view, the second object would appear in front of the first object. The view matrix may be defined by the developer of application 38.

Vertex shader 64 may clip the view space coordinates to a clip-space via a projection matrix. The projection matrix specifies a range of coordinates that the vertex shader transforms to a range of normalized device coordinates (NDCs) (e.g., −1.0 to 1.0). Vertex shader 64 clips all coordinates outside this range because those primitives are not visible. If only a part of a primitive is within the range, vertex shader 64 may clip the portion of the primitive outside the range, and generate primitives that fit inside the range.

Mathematically, vertex shader 64 may perform the following operation to generate the clip coordinates:

$$V\text{clip} = M_{projection} * M_{view} * M_{model} * V_{local},$$

where $M_{projection}$, $M_{view}$, and $M_{model}$ refer to the projection, view, and model matrices respectively, and $V_{local}$ refers to the local coordinates.

Binning circuit 66 receives the output from vertex shader 64 (e.g., vertices in clip coordinates) and determines to which tile (e.g., bin) a vertex belongs. For instance, the output of vertex shader 64 may be an x and y coordinate pair in viewer perspective, and a depth value (e.g., the z coordinate). Binning circuit 66 may utilize the x and y coordinates to determine to which tile that vertex belongs, as well as generate any additional graphics data needed for rendering by rendering pass circuitry 72. Binning circuit 66 may be a fixed function unit of one or more fixed-function units 50.

As an example, binning circuit 66 may determine to which tile each vertex belongs for a full pixel resolution image. GPU driver 42 may define a viewport, where the size of the viewport is the size of display 18 (e.g., 1920 pixels by 1080 pixels). GPU driver 42 may be preprogrammed with the size of display 18 during manufacture, or operating system 44 may provide the size of display 18 to GPU driver 42. GPU driver 42 may also provide information indicating the number of tiles, or the number of tiles may be preset and stored in local memory 14 or registers of GPU 12. In either case, binning circuit 66 may receive the size of the viewport and the number of tiles, and determine which pixels in the viewport belong to which tiles. In some examples, binning circuit 66 may receive information indicating the size of each tile and the number of tiles. In such examples, binning circuit 66 need not necessarily receive the viewport.

Vertex shader 64 may provide the x- and y-coordinates for the pixels from the viewer's perspective normalized to range between −1.0 to 1.0. Binning circuit 66 may utilize x and y-coordinates and the size and number of tiles to determine to which tile each of the vertices belongs. As an example, assume that there are 10×10 tiles, each with size of 10×10 pixels. In this example, if a vertex has NDC x and y coordinates of 0.6 and −0.4 respectively, binning circuit 66 may determine that the location of this vertex is at (80, 20) because each 0.1 step in the NDC is 5 pixels in this example. Because each tile is 10 pixels by 10 pixels, a vertex having x and y coordinates of 80 and 20 respectively would be in the eighth tile from the left, and second tile from the top. Binning circuit 66 may repeat such operations to identify to which tiles each of the vertices belong.

As described above, one example way in which binning circuit 66 may identify to which tile a vertex belongs is based on a digital value where each bit in the digital value corresponds to a tile. For vertices that belong to a particular tile, binning circuit 66 may set the bit corresponding to that tile to a digital one in the digital values for the vertices, and keep all others at a digital zero. There may be other ways to identify to which tile a vertex belongs.

Depth test circuit 68 may compare the z-coordinates of vertices processed by vertex shader 64 to determine whether a vertex is visible or not visible. Depth test circuit 68 may output the processed attributes of the vertices that are visible to streamout buffer 70. For example, if one vertex is in front of another vertex, then depth test circuit 68 may determine that the behind vertex is not visible and may not output any of the attribute data for the vertex to streamout buffer 70. In this way, binning pass circuitry 62 may generate a visibility stream of information that includes information indicating to which tile each vertex belongs.

The order of operations of binning pass circuitry 62 need not necessarily be set. For example, depth test circuit 68 may first determine whether vertex is occluded or not prior to binning circuit 66 determining to which tile the vertex belongs. Also, as described above, in some examples, application 38 may have defined the image resolution for the vertices. Accordingly, for the vertices that are visible whose attribute data is stored in streamout buffer 70, streamout buffer 70 may store the image resolution information for these vertices as well (e.g., as metadata as described above).

For examples, where application 38 defined the image resolutions in bands, binning circuit 66 may optionally determine to which resolution band a vertex belongs by comparing the x- and y-coordinates of the vertices and the resolution bands. Binning circuit 66 may store as attribute data in the streamout buffer 70 the image resolution information for the vertices. However, binning circuit 66 determining to which resolution band a vertex belongs is not necessary, and another component may determine to which resolution band a vertex belongs.

Rasterizer circuit 74 receives the attribute data for vertices of primitives from streamout buffer 70 and converts the primitives into pixels for display. For example, the primitives may be defined as vectors that indicate the interconnection of the primitives, and may be defined in a coordinate space that is independent of display 18 on which the image is to be displayed. Rasterizer circuit 74 converts these vectors into the display coordinates, and performs any additional functions such as removing points within primitives that are occluded. Rasterizer circuit 74 may be a fixed-function unit of one or more fixed-function units 50 and outputs values to pixel buffer 76.

In examples described in this disclosure, in converting vectors into the display coordinates, rasterizer circuit 74 may account for the image resolutions. As an example, application 38 may output a viewport command that defines the area within which rasterizer circuit 74 is to determine the display coordinates. In examples where the image resolution is not accounted for, the viewport command may define the size within which rasterizer circuit 74 is to determine the display coordinates to be the size of a tile (e.g., N×N). For example, for the first tile, the viewport command would define the size as (0, 0, N, N) (e.g., start from 0, 0 and end at N, N), for the second tile, the viewport command would define the size as (N, 0, N+N, N), and so forth.

However, in the examples described in this disclosure, rather than defining the size of the viewport to be the size of the tile, the size of the viewport may be smaller than the size of the tile and based on the image resolution. For example, GPU driver 42 may modify the viewport command defined by application 38.

For all the vertices that belong to the first tile, which is information available in streamout buffer 70 as the above described digital value, GPU driver 42 may determine to which resolution bands the vertices belong and whether there is a plurality or majority of image resolutions. As an example, assume there are five vertices in the first tile. For each vertex, GPU driver 42 may determine the image resolution defined by application 38. GPU driver 42 may determine if there is a particular image resolution that is a majority or the most likely image resolution. Based on the majority or most likely image resolution, GPU driver 42 may determine the image resolution for the first tile. In some examples, rather than using a majority or most likely image resolution, GPU driver 42 may determine an average or weighted average of the image resolutions to determine the image resolution for the first tile.

Also, in examples where attribute data defines the image resolutions for the vertices, GPU driver 42 may read the attribute data to determine the image resolution for the tile. For instance, similar to above, GPU driver 42 may determine if there is a majority or most likely image resolution and assign that image resolution for the entire tile, or some average or weighted average as the image resolution for the first tile.

GPU driver 42 may define the viewport (e.g., by modifying the viewport as defined by application 38) based on the determined image resolution and the size of the first tile. For example, if the determined resolution is one-quarter resolution, then GPU driver 42 may determine the size of the viewport as N/2×N/2. In this example, GPU driver 42 determined a ratio between the resolution of the image content in the first tile and the full resolution (e.g., quarter resolution) and multiplied the ratio with the size of the first tile to determine a size of the viewport (e.g., quarter multiplied by N×N is N/2×N/2).

In the above example, GPU driver 42 determined a resolution for the image content of the first tile. However, the image resolution for some of the vertices that are in the first tile may be different than the image resolution determined by GPU driver 42. For example, if vertices of a primitive in the first tile are defined to an image resolution of a quarter (e.g., based on the resolution band to which the primitive belonged), based on the majority image resolution, GPU driver 42 may determine that the image resolution for the first tile is full resolution. In this case, although defined for quarter resolution, the final rendered resolution for the pixels in the primitive may be full resolution. If, based on the majority resolution, GPU driver 42 determined that the image resolution for the first tile is eighth resolution, then although defined for quarter resolution, the final rendered resolution for the primitive may be eighth resolution.

Although the above example is described with respect to GPU driver 42, controller 46 may perform similar operations or GPU driver 42 and controller 46 may together perform these operations. For instance, controller 46 may define the viewport based on the determined image resolution for the tile and modify the viewport command.

Accordingly, GPU driver 42 or controller 46 may determine that a first portion (e.g., tile) of an image is to include image content having a first resolution (e.g., first image resolution). The first resolution is less than a second resolution for other portions of the image. For example, the first resolution may be an eighth resolution, and image content in other portions may be at full resolution or quarter resolution. GPU driver 42 or controller 46 may define a viewport for the first tile based on the first resolution of the image content in the first tile and the size of the first tile.

Pixel shader 78 receives the pixels from pixel buffer 76 as outputted by rasterizer circuit 74 and performs post processing to assign color values to each of the pixels that are to be displayed. For example, pixel shader 78 may receive constant values stored in system memory 10, texture data stored in system memory 10, and any other data to generate per-pixel outputs such as color values. Pixel shader 78 may also output opacity values that indicate the opaqueness of the pixels. Pixel shader 78 may output the resulting pixel values to local memory 14. In this way, rendering pass circuitry 72 may render the image content for the first portion (e.g., tile) at a size that is smaller than a size of the first portion and based on the first resolution of the image content in the first portion. For instance, rasterizer circuit 74 may determine display coordinates based on the size of viewport as defined by GPU driver 42 and/or controller 46, and pixel shader 78 may determine per-pixel values for each of the pixels in the viewport.

Although not illustrated, in some examples, pixel shader 78 may output to an output merge circuit (not shown in FIG. 5) for any final pixel processing. For example, the output merge circuit may utilize depth information to further determine whether any of the pixels should be removed from being displayed. The output merge circuit may also perform blending operations to generate final pixel values. In such examples, the output merge circuit may output the final pixel values to local memory 14.

Rendering pass circuitry 72 may repeat these operations for each portion, and generate image content for each portion. In some examples, only a single rendering pass may be needed, where a rendering pass refers to the rendering of image content in all of the portions. For example, application 38 may need to issue only one render command to have GPU 12 render the image content for each of the portions at different image resolutions, rather than issuing multiple rendering commands to have GPU 12 render the image content at different image resolutions.

As illustrated, controller 46 may cause local memory 14 to output the smaller-sized image content to frame buffer 80 of system memory 10. Then, to resize the image content, texture circuit 82 may retrieve the smaller-sized image content and its metadata, if available, and resize the image content using texture mapping as described above. Texture circuit 82 may store the resulting image content in local memory 14.

In some cases, such as for warping, texture circuit 82 may retrieve the image content from local memory 14 and warp the image content (e.g., shift or rotate the image content), and store the resulting warped image content in frame buffer 80. For instance, controller 46 or application 38 may re-determine a position of a user eye or eyes, or user head (application 38 may have originally determined the eye or head position during the eye-buffer round), and warp the resized image content based on the re-determined position of the eye or head. However, in some examples, texture circuit 82 may first warp the image content, and then resize the warped image content.

In some examples, it may be possible for texture circuit 82 to resize and warp the image content simultaneously. For example, in texture mapping the smaller-sized image content from system memory 10 to the mesh, texture circuit 82 may receive instructions that cause texture circuit 82 to map vertices to re-scale the image content, and also shift or rotate (e.g., warp) the image content. In this way, the warping may be done as part of the resizing.

For example, a warp (also called timewarp) is drawing to a mesh and has a warped transform on the U,V texture coordinates. Sparse allows mapping those U,V coordinates to the actual populated system memory for the texture (e.g., some U,V coordinates will map to the same texels in the scaled areas). This approach allows reading exactly the data needed for the final image with the populating of the colors in the warp mesh. In this example, it is scaling up as it fills in the warped mesh.

There may be other ways in which to resized. As an example, an upsample circuit (not illustrated) may retrieve the image content stored in frame buffer 80, and upsample the image content based on the determined image resolution. For example, GPU driver 42 or controller 46 may indicate, to the upsample circuit, the image resolution for each of the tiles. The upsample circuit may utilize the image resolution information to determine by how much to upsample the image content. For instance, if the image resolution for a first portion (e.g., tile) is quarter, then the upsample circuit may upsample the image content by a factor of four. If the image resolution for a second portion (e.g., tile) is full resolution, then the upsample circuit may function as a pass through with no upsampling.

There are various ways in which the upsample circuit may upsample the image content, and the techniques are not limited to any specific way in which to upsample. As one example, the upsample circuit may copy the same pixel value multiple times (e.g., four times to upsample by a factor of four). As another example, the upsample circuit may interpolate pixel values across a plurality of pixels to generate pixel values for additional pixels.

In the above example, the texture circuit 82 is described as performing the resizing and warping. However, the example techniques described in this disclosure are not so limited. In general, various example shaders, executing on shader core 48, may be configured to read the smaller-sized image content, and copy the image content onto a mesh.

Warping is merely one example operation for where the smaller-sized image content is read. However, there may other types of post-processing operations such as further blurring, filtering, blending, and the like that is to be performed on the smaller-sized image content (e.g., such as in non-VR/AR applications or possibly in VR/AR applications). A post-processing shader may perform the example operations described above for such post-processing operations. In this way, although the above example techniques are described with respect to warping operations, the example techniques are not so limited, and may be utilized for other image processing operations where storing smaller-sized image content is beneficial as compared to full-sized image content.

Furthermore, in the above example techniques, texture circuit 82 is described as storing the image content with full pixel resolution. However, the example techniques are not so limited. As one example, based on the foveation that is to be applied at different portions, even after warping, binning pass circuitry 62 and rendering pass circuitry 72 may perform foveation to reduce the amount of the data that needs to be stored in frame buffer 80, thereby reducing the memory bandwidth. As another example, texture circuit 82 may perform the warping without re-sizing the image content. In both of these examples, another processing circuit (e.g., display processor 16) may be configured to perform the resizing operations on the smaller-sized image content prior to display.

Figure 6:
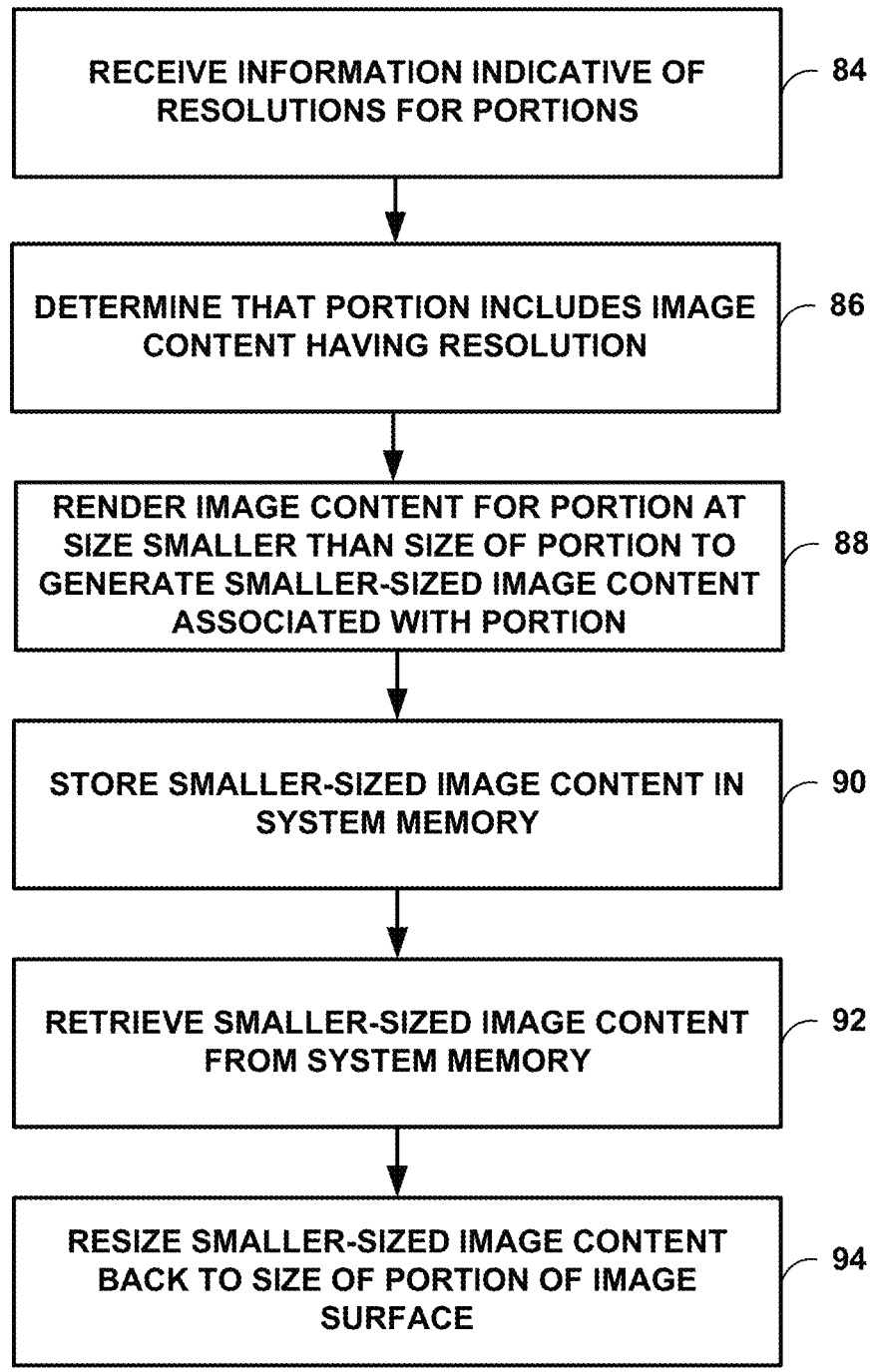
FIG. 6 is a flowchart illustrating an example method of generating image content.

FIG. 6 is a flowchart illustrating an example method of generating image content. In the example illustrated in FIG. 6, GPU 12 (e.g., controller 46) may receive information indicative of image resolutions for different portions of an image (84). This information indicative of image resolutions for different portions may have been generated by a server, application 38 executing on CPU 6, or by controller 46. The information indicative of image resolutions may indicate what fraction of image resolution is needed for the portion. As described, such changes in different resolutions allows for foveated rendering which promotes power savings.

Controller 46 may determine (e.g., based on information from application 38) for a first portion of the image that is to be displayed is to include image content having a first resolution (86). The first resolution may be less than a second resolution for one or more other portions of the image. As an example, the image resolution for a first portion may be $1/16^{th}$ but for a second portion may be $1/4^{th}$.

GPU 12 may render the image content for the first portion, at a size that is smaller than a size of the first portion, based on the first resolution of the image content in the first resolution, to generate smaller-sized image content that is associated with the first portion (88). As an example, referring back to FIG. 4A, for portion 54A, the image resolution may be $1/8^{th}$. Accordingly, GPU 12 may render the image content for portion 54A to size ⅛$^{th}$ of the size of portion 54A to generate smaller-sized image content that is associated with portion 54A.

GPU 12 may store the smaller-sized image content in system memory 10 (90). In some examples, GPU 12 may store the smaller-sized image content in system memory 10 without any resizing of the image content. This allows for GPU 12 to transmit less image content than if GPU 12 first resized the image content.

Processing circuitry (e.g., display processor 18 or GPU 12) may retrieve the smaller-sized image content from system memory 10 (92). The processing circuitry may resize the smaller-sized image content for viewing so that there are not blank spots in the image content (94). As described above, GPU 12 may utilize texture mapping techniques to resize. Also, in some examples, GPU 12 or display processor 18 may utilize an upsample circuit to resize the image content.

Figure 7:
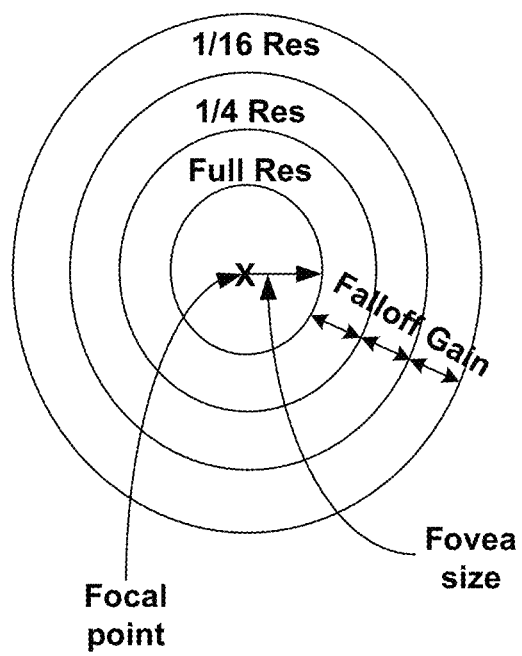
FIG. 7 is a conceptual diagram illustrating example foveation areas.

FIG. 7 is a conceptual diagram illustrating example foveation areas. As described above, the foveation information (e.g., scale factors used for resizing) may be stored in system memory 10 for use in resizing. For the operations described below with respect to FIG. 7, one way to perform the equations is by use of an application-facing application programming interface (API) that is used to enter the variables such as the coordinates for defining the foveation information.

As illustrated, the center of the circle represents the portion where there is no foveation, and the amount of foveation that is applied increases in portions of the image moving away from the center. As one example, the equation to determine the foveation (e.g., the equation for the foveation model) may be #max_pixel_scale=max(1,(px−fx)$^2$+gx$^2$+(py−fy)$^2$+gy$^2$−w). The variables px, py indicate the location of the pixel that is to be resized. The variables fx, fy indicate focal point in the NDC (normalized device coordinates), variables gx, gy indicate falloff gain, and w is the fovea size. The variables fx, fy, gx, gy, and w may be foveation parameters in a latched buffer as framebuffer metadata. Max_pixel_scale may be the maximum amount a pixel located at <px,py> in NDC can be upscaled. This allows an application to bound the minimum quality of each tile while giving the implementation flexibility on the size and shape of each tile.

The following describes some results that may potentially be achieved by implementing example techniques described in this disclosure. Achieving such results is not always required.

For certain test data, there was approximately greater than 30% less data to resolve (e.g., 37% or 44%) (e.g., from local memory 14 to system memory 10). There was also approximately greater than 30% reduction in data that was read from system memory 10 for warping.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Various aspects and examples have been described. However, modifications can be made to the structure or techniques of this disclosure without departing from the scope of the following claims.

What is claimed is:

1. A method of generating image content, the method comprising:
   determining that a first portion of a plurality of portions of an image to be displayed includes image content having a first resolution, wherein each portion of the plurality of portions has a respective size of a number of pixels of the image, and wherein the first resolution is less than a second resolution of one or more other portions of the image, including a second portion of the one or more other portions of the image;
   as part of an eye-buffer round:
      rendering the image content for the first portion, at a size smaller than the size of the first portion, such that a number of rendered pixels for the first portion is less than a number of pixels in the first portion, based on the first resolution of the image content in the first portion, to generate smaller-sized image content associated with the first portion;
      rendering image content for the second portion, at a size equal to the size of the second portion, to generate image content associated with the second portion;
      storing the smaller-sized image content associated with the first portion in a system memory; and
      storing the image content associated with the second portion in the system memory;
   as part of a warping round:
      retrieving the smaller-sized image content associated with the first portion from the system memory; and
      resizing the smaller-sized image content associated with the first portion back to the size of the first portion of the image; and outputting for display the resized image content associated with the first portion and the image content associated with the second portion.

2. The method of claim 1, further comprising:
receiving a first part of the image content that is viewable by a user, and a second part of the image content of surrounding areas that are not viewable by the user, wherein the received first part of the image content includes the image content for the first portion of the image and the second part of the image content includes image content other than the image content for the second portion;
as part of the eye-buffer round:
rendering the received second part of the image content at a different size than the size at which the first portion is rendered; and
storing the rendered parts second part of the image content in the system memory;
as part of the warping round:
retrieving a subset of the rendered parts second part of the image content; and
resizing the subset of the rendered second part of the image content.

3. The method of claim 1, wherein resizing the smaller-sized image content comprises:
texture mapping the smaller-sized image content to a mesh to resize the image content to fit within the image.

4. The method of claim 1, further comprising:
storing metadata indicative of one or more of the size of the first portion, a size of the smaller-sized image content, or the first resolution,
wherein resizing the smaller-sized image content comprises resizing the smaller-sized image content based on the stored metadata.

5. The method of claim 1, further comprising:
determining a size of the smaller-sized image content after storing the smaller-sized image content in the system memory,
wherein resizing the smaller-sized image content comprises resizing the smaller-sized image content based on the determination of the size of the smaller-sized image content.

6. The method of claim 1, further comprising:
determining a position of at least one of a user eye or eyes or a user head;
receiving information indicative of resolutions for portions of the image based on the determined position of at least one of the user eye or eyes or user head,
wherein determining that the first portion of the image includes image content having the first resolution comprises determining that the first portion of the image includes image content having the first resolution based on the received information.

7. The method of claim 6, further comprising:
one of prior to resizing or after resizing, re-determining the position of the user head; and
warping one of the smaller-sized image content or the resized image content based on the re-determined position of the user head.

8. The method of claim 1, further comprising:
defining a viewport for the first portion based on the first resolution of the image content in the first portion and the size of the first portion,
wherein rendering the image content for the first portion, at the size that is smaller than the size of the first portion, comprises rendering the image content for the first portion based on the defined viewport for the first portion.

9. The method of claim 8, wherein defining the viewport comprises multiplying a ratio between the first resolution and a full resolution of the image content by the size of the first portion to determine a size of the viewport.

10. The method of claim 1, further comprising:
determining resolutions for the portions of the image; and
during a binning pass, and prior to the rendering, determining which vertices of primitives of the image belong to the first portion,
wherein determining that the first portion of the image includes image content having the first resolution comprises determining that the first portion of the image includes image content having the first resolution based on the determination of resolutions for different portions of the image and the determination of which vertices of the image belong to the first portion.

11. A device for generating image content, the device comprising:
a system memory; and
processing circuitry comprising at least one of programmable or fixed-function circuitry and a local memory, wherein the processing circuitry is configured to:
determine that a first portion of a plurality of portions of an image to be displayed includes image content having a first resolution, wherein each portion of the plurality of portions has a respective size of a number of pixels of the image, and wherein the first resolution is less than a second resolution of one or more other portions of the image, including a second portion of the one or more other portions of the image;
as part of an eye-buffer round:
render the image content for the first portion, at a size smaller than the size of the first portion, such that a number of rendered pixels for the first portion is less than a number of pixels in the first portion, based on the first resolution of the image content in the first portion, to generate smaller-sized image content associated with the first portion that is stored to the local memory;
render image content for the second portion, at a size equal to the size of the second portion, to generate image content associated with the second portion that is stored in the local memory;
store the smaller-sized image content associated with the first portion from the local memory to the system memory; and
store the image content associated with the second portion from the local memory to the system memory;
as part of a warping round:
retrieve the smaller-sized image content associated with the first portion from the system memory; and
resize the smaller-sized image content associated with the first portion back to the size of the first portion of the image; and
output for display the resized image content associated with the first portion and the image content associated with second portion.

12. The device of claim 11, wherein the processing circuitry is configured to receive a first part of the image content that is viewable by a user, and a second part of the image content of surrounding areas that are not viewable by the user, wherein the received first part of the image content includes the image content for the first portion of the image and the second part of the image content includes image content other than the image content for the second portion;

as part of the eye-buffer round, the processing circuitry is configured to:
        render the received second part of the image content at a different size than the size at which the first portion is rendered; and
        store the rendered second part of the image content in the system memory;
    as part of the warping round, the processing circuitry is configured to:
        retrieve a subset of the rendered second part of the image content; and
        resize the subset of the rendered second part of the image content.

13. The device of claim 11, wherein the processing circuitry includes a graphics processing unit (GPU), and wherein to resize the smaller-sized image content, the GPU is configured to:
    texture map the smaller-sized image content to a mesh to resize the image content to fit within the image.

14. The device of claim 11, wherein the processing circuitry is configured to:
    store metadata indicative of one or more of the size of the first portion, a size of the smaller-sized image content, or the first resolution, and
    wherein to resize the smaller-sized image content, the processing circuitry is configured to resize the smaller-sized image content based on the stored metadata.

15. The device of claim 11, wherein the processing circuitry is configured to:
    determine a size of the smaller-sized image content after storing the smaller-sized image content in the system memory, and
    wherein to resize the smaller-sized image content, the processing circuitry is configured to resize the smaller-sized image content based on the determination of the size of the smaller-sized image content.

16. The device of claim 11, wherein the processing circuitry is configured to:
    determine a position of at least one of a user eye or eyes or a user head; and
    receive information indicative of resolutions for portions of the image based on the determined position of at least one of the user eye or eyes or a user head, and
    wherein to determine that the first portion of the image includes image content having the first resolution, the processing circuitry is configured to determine that the first portion of the image includes image content having the first resolution based on the received information.

17. The device of claim 16, wherein the processing circuitry is configured to:
    one of prior to resizing or after resizing, re-determine the position of the user head; and
    warp one of the smaller-sized image content or the resized image content based on the re-determined position of the user head.

18. The device of claim 11, wherein the processing circuitry is configured to:
    define a viewport for the first portion based on the first resolution of the image content in the first portion and the size of the first portion, and
    wherein to render the image content for the first portion, at the size that is smaller than the size of the first portion, the processing circuitry is configured to render the image content for the first portion based on the defined viewport for the first portion.

19. The device of claim 18, wherein to define the viewport, the processing circuitry is configured to multiply a ratio between the first resolution and a full resolution of the image content by the size of the first portion to determine a size of the viewport.

20. The device of claim 11, wherein the processing circuitry is configured to:
    determine resolutions for the portions of the image; and
    during a binning pass, and prior to the rendering, determine which vertices of primitives of the image belong to the first portion, and
    wherein to determine that the first portion of the image includes image content having the first resolution, the processing circuitry is configured to determine that the first portion of the image includes image content having the first resolution based on the determination of resolutions for different portions of the image and the determination of which vertices of the image belong to the first portion.

21. The device of claim 11, wherein the processing circuitry comprises a graphics processing unit (GPU).

22. A device for generating image content, the device comprising:
    means for determining that a first portion of a plurality of portions of an image to be displayed includes image content having a first resolution, wherein each portion of the plurality of portions has a respective size of a number of pixels of the image, and wherein the first resolution is less than a second resolution of one or more other portions of the image, including a second portion of the one or more other portions of the image;
    as part of an eye-buffer round:
        means for rendering the image content for the first portion, at a size smaller than the size of the first portion, such that a number of rendered pixels for the first portion is less than a number of pixels in the first portion, based on the first resolution of the image content in the first portion, to generate smaller-sized image content associated with the first portion;
        means for rendering image content for the second portion, at a size equal to a size of the second portion, to generate image content associated with the second portion;
        means for storing the smaller-sized image content associated with the first portion in a system memory; and
        means for storing the image content associated with the second portion in the system memory
    as part of a warping round:
        means for retrieving the smaller-sized image content associated with the first portion from the system memory; and
        means for resizing the smaller-sized image content associated with the first portion back to the size of the first portion of the image; and
    means for outputting for display the resized image content associated with the first portion and the image content associated with the second portion.

23. The device of claim 22, further comprising:
    means for storing metadata indicative of one or more of the size of the first portion, a size of the smaller-sized image content, or the first resolution,
    wherein the means for resizing the smaller-sized image content comprises means for resizing the smaller-sized image content based on the stored metadata.

24. The device of claim 22, further comprising:
means for determining a size of the smaller-sized image content after storing the smaller-sized image content in the system memory,
wherein the means for resizing the smaller-sized image content comprises means for resizing the smaller-sized image content based on the determination of the size of the smaller-sized image content.

25. A computer-readable storage medium having instructions stored thereon that when executed cause one or more processors of a device for generating image content to:
determine that a first portion of a plurality of portions of an image to be displayed includes image content having a first resolution, wherein each portion of the plurality of portions has a respective size of a number of pixels of the image, and wherein the first resolution is less than a second resolution of one or more other portions of the image, including a second portion of the one or more other portions of the image;
as part of an eye-buffer round:
render the image content for the first portion, at a size that is smaller than the size of the first portion, such that a number of rendered pixels for the first portion is less than a number of pixels in the first portion, based on the first resolution of the image content in the first portion, to generate smaller-sized image content associated with the first portion;
render image content for the second portion, at a size equal to the size of the second portion, to generate image content associated with the second portion that is stored in the local memory;
store the smaller-sized image content associated with the first portion in a system memory; and
store the image content associated with the second portion in the system memory;
as part of a wrapping round:
retrieve the smaller-sized image content associated with the first portion from the system memory; and
resize the smaller-sized image content associated with the first portion back to the size of the first portion of the image; and
output for display the resized image content associated with the first portion and the image content associated with the second portion.

26. The computer-readable storage medium of claim 25, further comprising instructions that cause the one or more processors to:
store metadata indicative of one or more of the size of the first portion, a size of the smaller-sized image content, or the first resolution,
wherein the instructions that cause the one or more processors to resize the smaller-sized image content comprise instructions that cause the one or more processors to resize the smaller-sized image content based on the stored metadata.

27. The computer-readable storage medium of claim 25, further comprising instructions that cause the one or more processors to:
determine a size of the smaller-sized image content after storing the smaller-sized image content in the system memory,
wherein the instructions that cause the one or more processors to resize the smaller-sized image content comprise instructions that cause the one or more processors to resize the smaller-sized image content based on the determination of the size of the smaller-sized image content.

* * * * *